(12) United States Patent
Odate et al.

(10) Patent No.: US 8,579,066 B2
(45) Date of Patent: Nov. 12, 2013

(54) VEHICLE SEAT BELT DEVICE

(75) Inventors: Shotaro Odate, Utsunomiya (JP); Takeshi Kojima, Saitama (JP); Yo Ito, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/582,218

(22) PCT Filed: Feb. 25, 2011

(86) PCT No.: PCT/JP2011/054311
§ 371 (c)(1),
(2), (4) Date: Aug. 31, 2012

(87) PCT Pub. No.: WO2011/108458
PCT Pub. Date: Sep. 9, 2011

(65) Prior Publication Data
US 2012/0325574 A1  Dec. 27, 2012

(30) Foreign Application Priority Data
Mar. 4, 2010 (JP) ................. 2010-047831

(51) Int. Cl.
*B60R 22/343* (2006.01)
(52) U.S. Cl.
USPC ........ 180/268; 180/282; 242/384; 242/390.9; 280/806; 280/807; 297/477; 297/480; 701/45
(58) Field of Classification Search
USPC ........................ 180/268, 275, 282; 242/374, 242/384–384.4, 390.8, 390.9; 280/806, 280/807; 297/474–480; 701/45, 48, 70
See application file for complete search history.

(56) References Cited

U.S. PATENT DOCUMENTS

| | | | | |
|---|---|---|---|---|
| 3,797,603 A | * | 3/1974 | Loomba | 180/268 |
| 5,441,304 A | * | 8/1995 | Zygutis et al. | 280/806 |
| 6,447,012 B2 | * | 9/2002 | Peter et al. | 280/806 |
| 6,722,698 B2 | * | 4/2004 | Viano et al. | 280/806 |

(Continued)

FOREIGN PATENT DOCUMENTS

| | | |
|---|---|---|
| DE | 10160071 A1 | 6/2003 |
| EP | 0893313 A2 | 1/1999 |

(Continued)

OTHER PUBLICATIONS

European Search Repo Application No. 11750568.5 dated Sep. 4, 2013, 3 pages.

*Primary Examiner* — Faye M Fleming
*Assistant Examiner* — Laura Freedman
(74) *Attorney, Agent, or Firm* — Rankin, Hill & Clark LLP

(57) ABSTRACT

This seat belt device of a vehicle includes a webbing, a belt reel, a motor, a clutch, detection unit, brake control unit and motor control unit. The motor control unit includes a waiting current control unit configured to conduct a current that can maintain the clutch to be in the connection state in the motor when the brake control unit outputs the operation signal and variable current control unit configured to proceed from current control performed by the waiting current control unit when a change in the movement state of the vehicle is detected by the detection unit during the current control performed by the waiting current control unit and adjusts the amount of conduction in the motor based on the movement state of the vehicle that is detected by the detection unit.

6 Claims, 15 Drawing Sheets

(56) References Cited

U.S. PATENT DOCUMENTS

| | | | |
|---|---|---|---|
| 7,028,802 B2 * | 4/2006 | Tobata | 180/268 |
| 7,029,032 B2 * | 4/2006 | Bullinger et al. | 280/806 |
| 7,029,033 B2 * | 4/2006 | Tobata | 280/807 |
| 7,100,945 B2 * | 9/2006 | Bullinger et al. | 280/806 |
| 7,325,641 B2 * | 2/2008 | Bullinger et al. | 180/268 |
| 7,343,235 B2 * | 3/2008 | Isaji et al. | 701/45 |
| 7,568,542 B2 * | 8/2009 | Fukuda | 180/268 |
| 7,641,237 B2 * | 1/2010 | Odate | 280/807 |
| 7,654,573 B2 * | 2/2010 | Kudo et al. | 280/806 |
| 7,686,118 B2 * | 3/2010 | Akaba et al. | 180/268 |
| 8,046,136 B2 * | 10/2011 | Odate | 701/45 |
| 8,141,806 B2 * | 3/2012 | Odate et al. | 242/384 |
| 8,412,417 B2 * | 4/2013 | Odate | 701/45 |
| 2005/0139408 A1 | 6/2005 | Bullinger et al. | |
| 2005/0252710 A1 | 11/2005 | Akaba et al. | |
| 2006/0006269 A1 * | 1/2006 | Wier | 242/374 |
| 2006/0145463 A1 | 7/2006 | Isaji et al. | |
| 2006/0237960 A1 | 10/2006 | Kudo et al. | |
| 2013/0041559 A1 * | 2/2013 | Odate | 701/45 |

FOREIGN PATENT DOCUMENTS

| | | |
|---|---|---|
| EP | 2077209 A1 | 7/2009 |
| JP | 2001-122081 | 5/2001 |
| JP | 2004-224134 | 8/2004 |
| JP | 2010-023644 | 2/2010 |

* cited by examiner

VEHICLE SEAT BELT DEVICE

TECHNICAL FIELD

The present invention relates to a seat belt device that restrains a vehicle occupant seated on a seat of a vehicle through a webbing, and a method of controlling thereof.

Priority is claimed on Japanese Patent Application No. 2010-47831, filed Mar. 4, 2010, the content of which is incorporated herein by reference.

BACKGROUND ART

Seat belt devices are known which effectively restrain and protect a vehicle occupant by retracting a webbing through a pretensioner in a case where a side-slippage of a vehicle body, slipping of vehicle wheels, or the like occurs at the time of driving (for example, see Patent Document 1). In such seat belt devices, a control unit determines the state of a side-slippage of a vehicle based on detection values acquired by a wheel-speed sensor, a yaw rate sensor, a lateral acceleration sensor, a steering angle sensor, and the like.

In addition, a seat belt device that uses a motor as a driving source of the pretensioner is known.

RELATED ART DOCUMENT

Patent Document

[Patent Document 1] Japanese Unexamined Patent Application, First Publication No. 2001-122081

DISCLOSURE OF THE INVENTION

Problems to be Solved by the Invention

However, in the conventional seat belt device, the pretensioner is operated after the start of a side-slippage of the vehicle. Accordingly, for example, in a motor driving pretensioner, there is a time delay until the webbing is retracted after the motor is actually electrically conducting, and there is a case where the timing for restraining the vehicle occupant is late.

In addition, there is a case where a vehicle occupant feels a sense of discomfort by an excessive operation of the pretensioner when the degree of the side-slippage is low.

In addition, decreasing the sense of discomfort can be technically performed by suppressing excessive operation of the pretensioner. In such a case, a seat belt control device independently determines the movement state of the vehicle based on the detection values acquired by various sensors, and switches the operation state (the strength of winding the webbing or the like) in accordance with the determination. However, in such a case, a high operation capability is required for the seat belt control device, and accordingly, the cost increases.

An object of the present invention is to provide a seat belt device of a vehicle that can restrain a vehicle occupant at the optimal timing and decrease the sense of discomfort of a vehicle occupant.

Means for Solving the Problems

A vehicle seat belt device according to the present invention employs the following configurations so as to solve the above-described problems.

(1) A vehicle seat belt device according to an aspect of the present invention includes: a webbing that retains a vehicle occupant seated on a seat of a vehicle; a belt reel around which the webbing is wound; a motor that delivers a rotational driving force to the belt reel; a clutch that maintains a connection state between the motor and the belt reel in a case where rotation torque in a webbing winding direction of the motor, which is equal to or larger than a set value, is received; a detection unit configured to detect a movement state of the vehicle; a brake control unit configured to control a vehicle behavior by compressing or decompressing liquid placed inside a wheel cylinder of a brake device that brakes vehicle wheels of the vehicle; and a motor control unit configured to control an amount of conduction in the motor when the brake control unit outputs an operation signal representing that control of the vehicle behavior is in the middle of the process or when the movement state of the vehicle is detected by the detection unit to be in a movement state set in advance, wherein the motor control unit includes: a waiting current control unit configured to conduct a current that can maintain the clutch to be in the connection state in the motor when the brake control unit outputs the operation signal; and a variable current control unit configured to adjust the amount of conduction in the motor based on the movement state of the vehicle that is detected by the detection unit, and the variable current control unit proceeds from current control performed by the waiting current control unit to current control performed by the variable current control unit when a change in the movement state of the vehicle is detected by the detection unit during the current control performed by the waiting current control unit.

(2) In the vehicle seat belt device described in (1) above, the brake control unit may include a precompressing unit configured to perform precompressing control of pressure of the liquid placed inside the wheel cylinder in a non-operating state of an acceleration pedal of the vehicle. In such a case, the current control performed by the waiting current control unit may be performed also when the motor control unit outputs a precompressing operation signal that represents that the precompressing unit is in an operating state.

(3) In the vehicle seat belt device described in (1) or (2) above, the brake control unit may output an operation signal that differs in accordance with an operating state.

(4) In the vehicle seat belt device described in (3) above, the brake control unit may include a first control unit configured to compress or decompress the liquid placed inside the wheel cylinder in accordance with a steering operation not based on a slippage state of the vehicle and outputting the operating signal.

(5) In the vehicle seat belt device described in (4) above, the brake control unit may further include a second control unit configured to compress or decompress the liquid placed inside the wheel cylinder in accordance with the degree of the slippage state of the vehicle and outputting the operating signal. In such a case, the variable current control unit may compare a target current to be supplied to the motor, which is determined based on the movement state of the vehicle that is detected by the detection unit, and an actual current that flows through the motor with each other, change the actual current based on the comparison result such that the actual current of the motor approaches the target current, and, in a case where the amount of control performed by the first control unit is equal to or larger than a first set value, decrease the amount of change at that time more than that of a case where the amount of control performed by the second control unit is equal to or larger than a second set value.

(6) In the vehicle seat belt device described in (5) above, the variable current control unit may set the amount of change to be maximum in a case where the degree of the slippage state of the vehicle is equal to or larger than a reference that is set in advance.

(7) In the vehicle seat belt device described in (5) or (6) above, the brake control unit may output the operating signal by performing control performed by the first control unit only when the vehicle is driven at low speed.

Effects of the Invention

According to the seat belt device described in (1) described above, even in a case where the intervention of the brake control unit in the control of the vehicle behavior is performed in a speedy manner, only a current (hereinafter, referred to as a waiting current) that can maintain the motor and the clutch to be in a connection state at that time flows. Accordingly, the load of the motor is delivered to a vehicle occupant through the webbing as an extremely light reaction force, and the posture of the vehicle occupant can be maintained. Therefore, the vehicle occupant can be maintained in a natural driving posture without applying a large reaction force to the vehicle occupant, whereby it is difficult for the vehicle occupant to sense discomfort.

When the value representing the movement state of the vehicle changes during the control of the amount of conduction in the motor at the waiting current, the process proceeds to variable current control in which the amount of conduction in the motor is controlled in accordance with the value representing the movement state. Through this, the restraining force for the vehicle occupant through the webbing can be appropriately changed in accordance with the change in the value representing the movement state of the vehicle.

In the case of (2) described above, even when the precompressing unit is operated, the waiting current that can maintain the motor and the clutch to be in the connection state flows. Accordingly, even in a case where large deceleration acts by performing a brake operation thereafter, from the state in which the clutch is maintained to be in the connection state, the process proceeds to the variable current control in which the amount of conduction in the motor is controlled in accordance with the value representing the movement state of the vehicle. Through this, the time delay until the webbing is retracted can be configured to be extremely small, thereby the posture of the vehicle occupant can be reliably achieved in a speedy manner.

In the case of (3) described above, the motor control unit does not independently determine the vehicle behavior, the movement state of the vehicle, and the like. Accordingly, the calculation load of the motor control unit can be reduced.

In the case of (4) described above, when the control by the first control unit is performed, so-called turning assist brake control is performed in which the turning is assisted through a brake when the vehicle is turned through steering. Even when the turning assist is performed, current control of the current flowing through the motor can be performed. In addition, even when the turning assist brake control is frequently performed for each steering, the current control of the current flowing through the motor is started from the control according to the waiting current. Accordingly, the vehicle occupant does not acquire a sense of discomfort. Even in a case where the vehicle behavior becomes unstable as a result of the steering, and, the target current for the motor is changed, the process can proceed to the current control toward the target current without a delay of time.

In the case of (5) described above, the amount of change in current at a time when the actual current of the motor approaches the target current can be configured to be different in accordance with a difference in the operating signal that is output by the brake control unit. In a case where the amount of control performed by the first control unit is equal or larger than the first set value, the amount of change in the current is decreased more than that in a case where the amount of control performed by the second control unit is equal to or larger than the second set value. Through this, a change in the torque of the motor at the time of performing control (the turning assist brake control) through the first control unit can be configured to be smaller than the change in the torque of the motor at the time of performing the control (side-slippage-suppressing brake control) through the second control unit. Accordingly, even in a case where a restraining force is increased due to the retraction of the webbing at the time of performing the turning assist brake control, it is difficult to give a sense of discomfort to a vehicle occupant.

In the case of (6) described above, the amount of change in the current is the maximum when the degree of the slippage state of the vehicle is equal to or higher than a reference that is set in advance. Accordingly, in this case, the webbing can be wound by increasing the amount of conduction in the motor to the target current in a speedy manner. Therefore, in an emergency, a vehicle occupant can be restrained in a speedy manner.

In the case of (7) described above, when the vehicle is driven at middle or high speed, the control performed by the first control unit is not performed, and an operating signal is not output from the first control unit. Accordingly, in this case, the amount of change in the current of the motor can be determined based on the operating signal (control amount) that is output from the second control unit.

As a result, when the vehicle behavior becomes unstable at middle or high speed, the webbing can be wound by increasing the amount of conduction in the motor up to the target current in a speedy manner, and the vehicle occupant can be restrained in a speedy manner.

EMBODIMENTS OF THE INVENTION

Hereinafter, a vehicle seat belt device according to an embodiment of the present invention will be described with reference to FIGS. 1 to 17.

Figure 1:
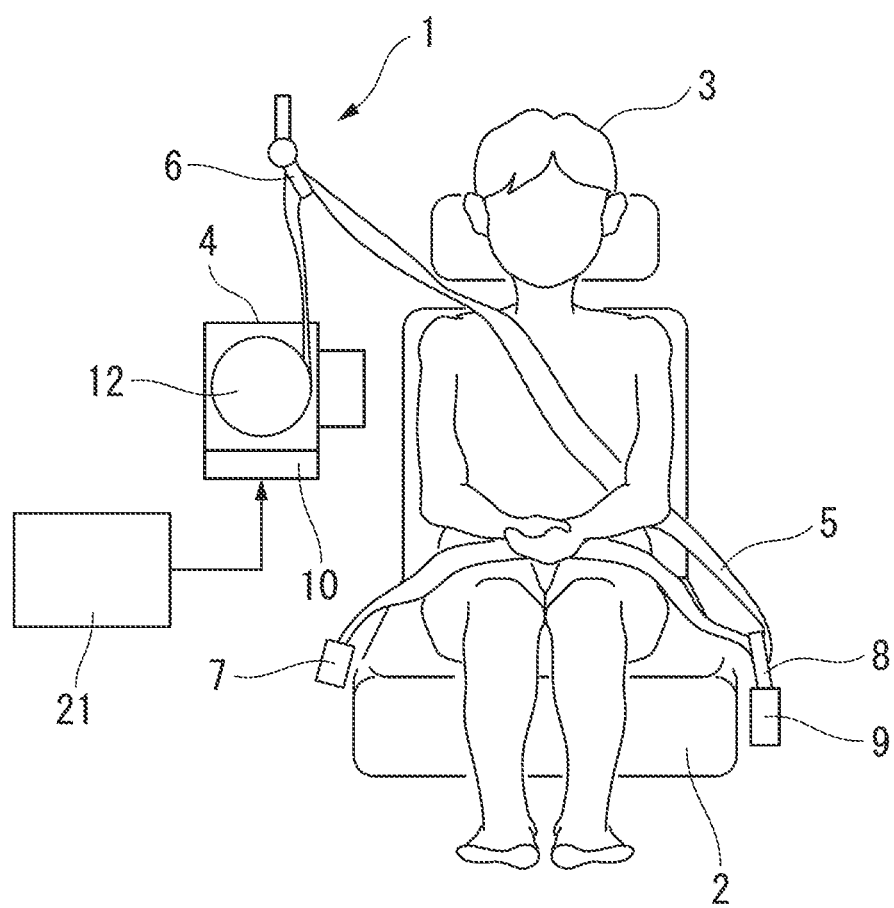
FIG. 1 is a schematic configuration diagram of a seat belt device according to an embodiment of the present invention.

FIG. 1 illustrates a schematic whole configuration of the seat belt device 1 according to the present embodiment. A seat 2 that is illustrated in FIG. 1 is a seat on which a vehicle occupant 3 is seated. The seat belt device 1 according to this embodiment is a so-called three point-type seat belt device. In the seat belt device 1, a webbing 5 is drawn to the upper side from a retractor 4 attached to a center pillar not illustrated in the figure. The webbing 5 is inserted into and passes through a through anchor 6 that is supported at an upper side of the center pillar. The tip end of the webbing 5 is fixed to the floor of the vehicle body through an outer anchor 7 located close to the vehicle exterior side of the seat 2. A tongue plate 8 is inserted and passes between the through anchor 6 of the webbing 5 and the outer anchor 7. The tongue plate 8 can be attached to or detached from a buckle 9 that is fixed to the vehicle body floor that is close to the vehicle inner side of the seat 2.

The webbing 5 is wound in the retractor 4 in its initial state, and as a vehicle occupant 3 draws out the webbing by hand and fixes the tongue plate 8 to the buckle 9, the chest part and the abdominal part of the vehicle occupant 3 are restrained with respect to the seat 2.

Figure 2:
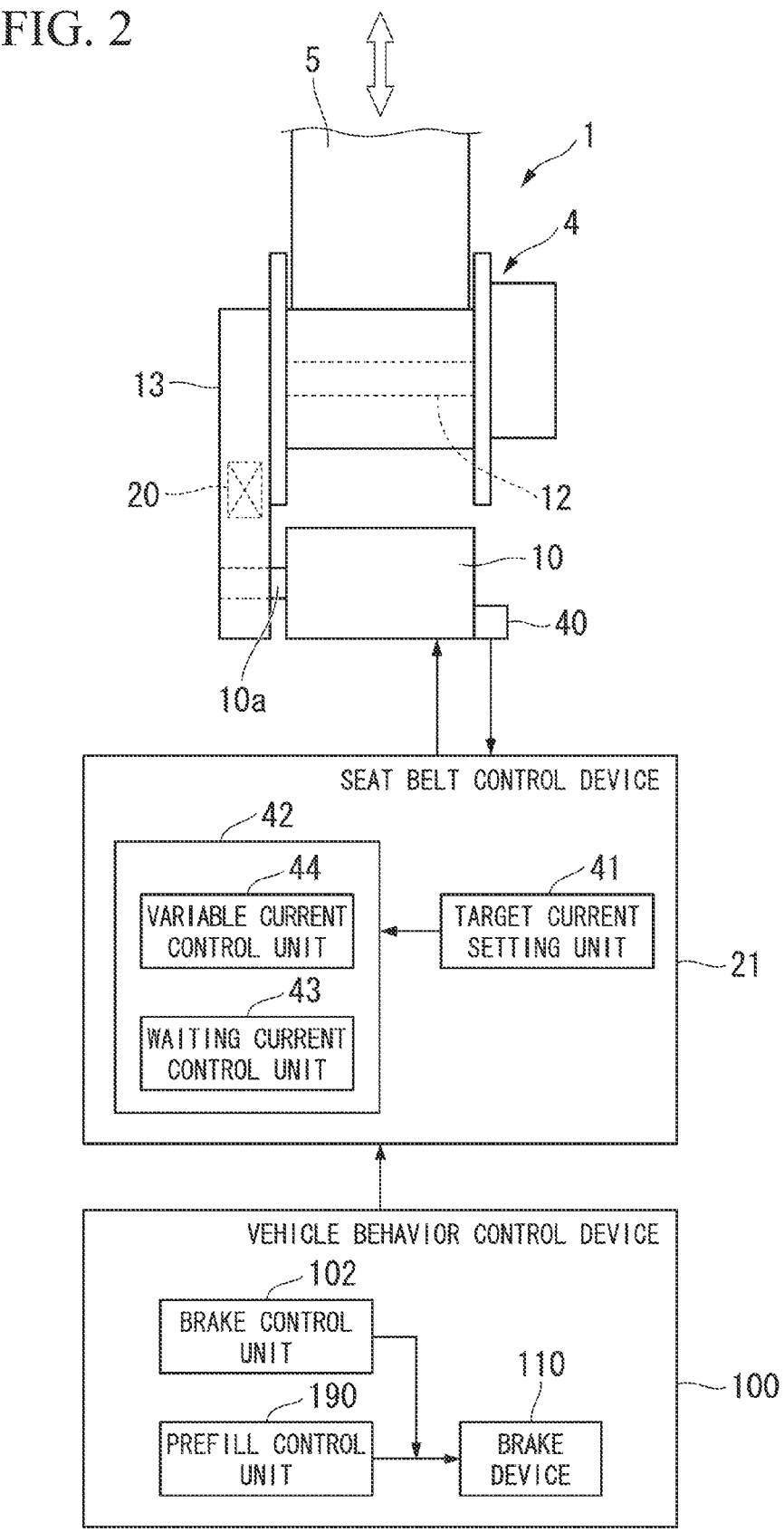
FIG. 2 is a schematic configuration diagram of a retractor and a control device of the seat belt device according to the above-described embodiment.

The retractor 4, as illustrated in FIG. 2 includes a belt reel 12. The belt reel 12 is supported by a casing (not illustrated in the figure) so as to be rotatable, and the webbing 5 is wound therein. The shaft of the belt reel 12 protrudes to one end side of the casing. The belt reel 12 is connected to the rotation shaft 10a of a motor 10 so as to be linked thereto through a power transmission mechanism 13. The power transmission mechanism 13 decelerates the rotation of the motor 10 so as to be delivered to the belt reel 12. In addition, in the retractor 4, a winding spring, which is not illustrated in the figure, is disposed that biases the belt reel 12 in the webbing winding direction. In a state in which the belt reel 12 and the motor 10 are detached from each other by a clutch 20, a tensile force according to the winding spring acts on the webbing 5.

In this seat belt device 1, when a vehicle behavior control device (braking control unit) 100 to be described later is operated and when the vehicle is in a movement state (predetermined movement state) that is set in advance, the motor 10 is electrically conducting, and the retraction of the webbing 5 or the like is performed by controlling the current flowing therein.

Figure 3:
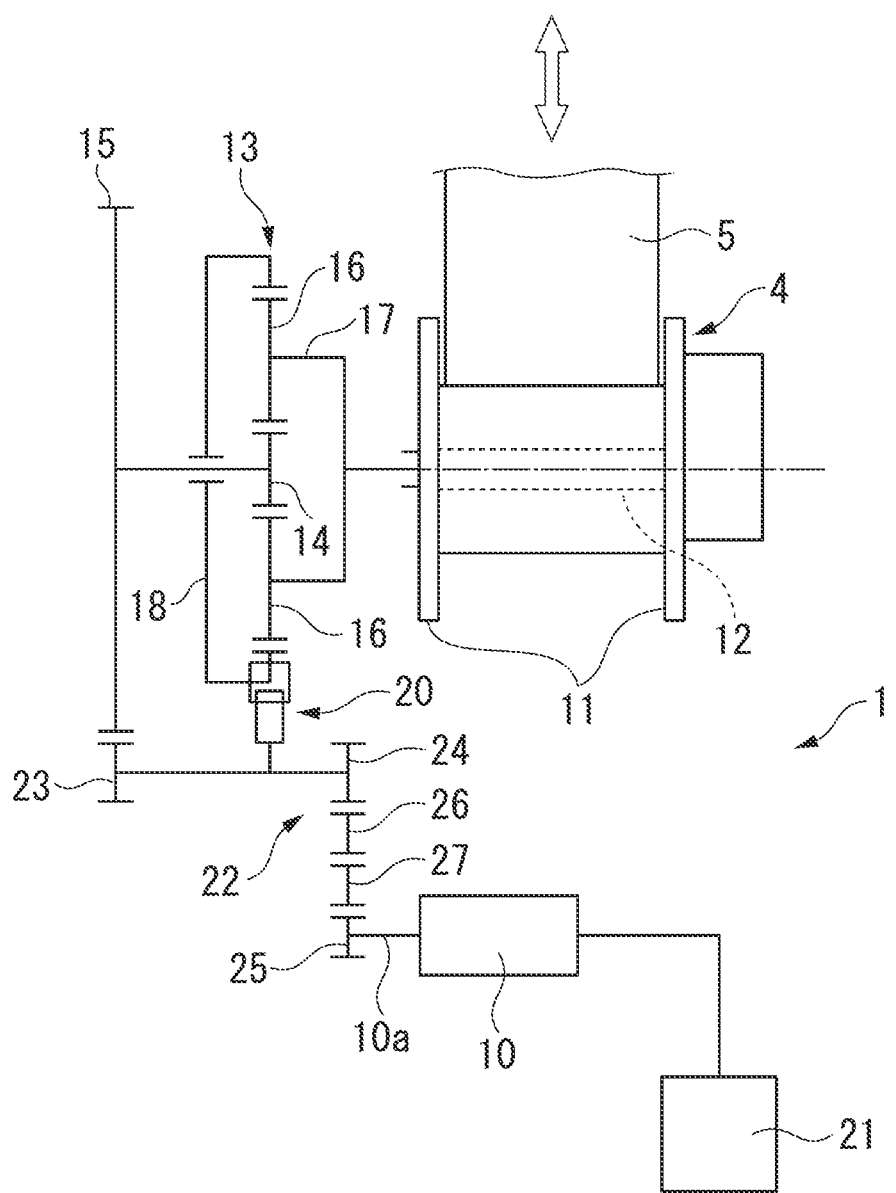
FIG. 3 is a schematic configuration diagram of the above-described retractor.
Figure 4:
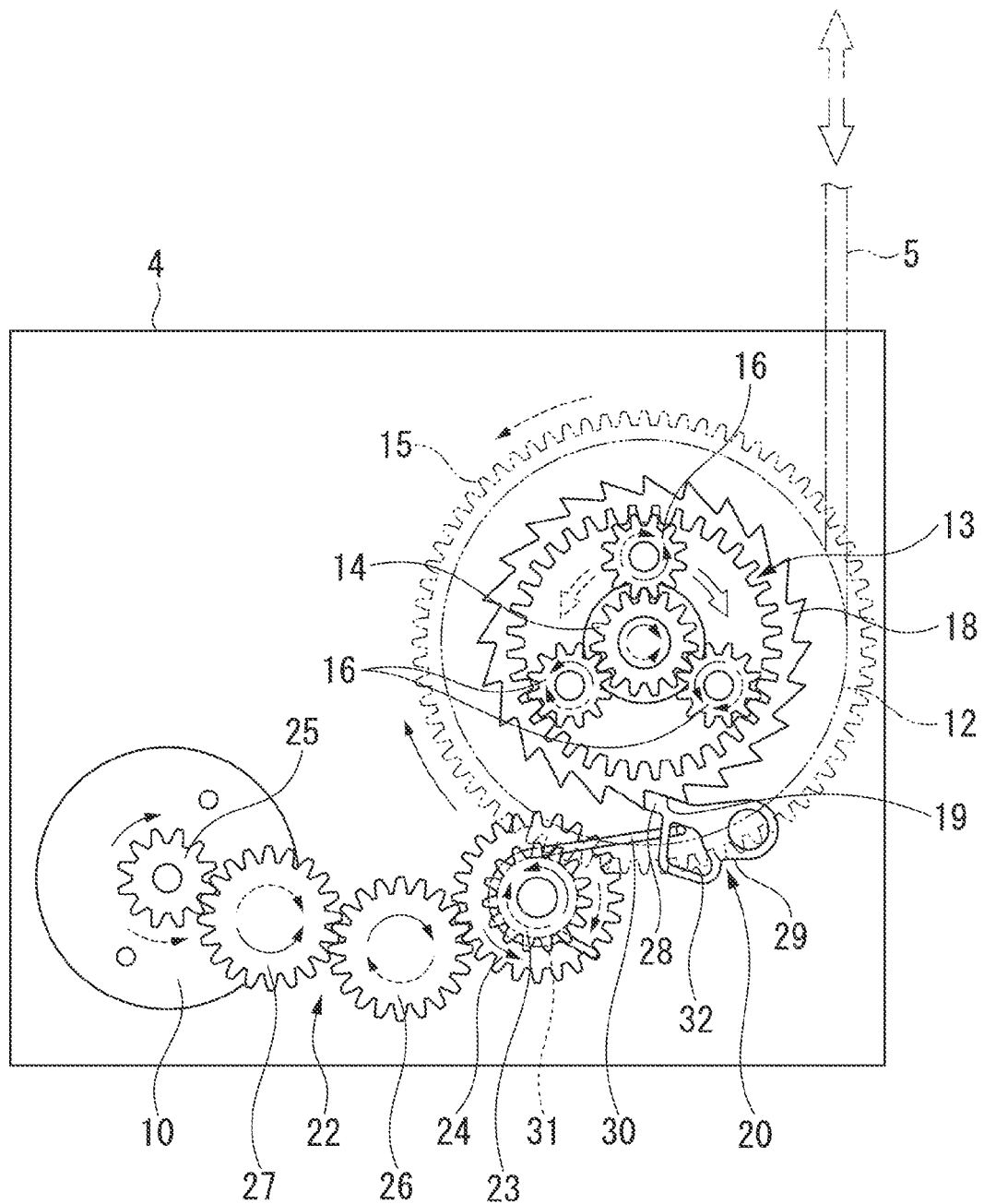
FIG. 4 is a schematic configuration diagram of a powertrain of the retractor viewed on the front side.
Figure 5:
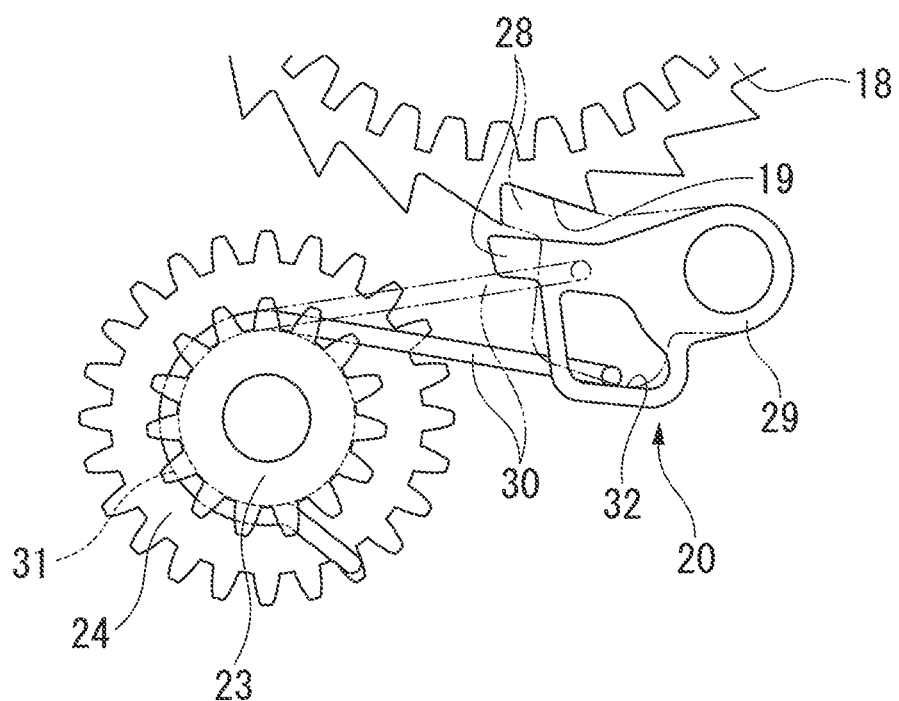
FIG. 5 is an enlarged diagram of a part of the powertrain.

FIGS. 3 to 5 illustrate a specific configuration of the power transmission mechanism 13.

In the power transmission mechanism 13, a sun gear 14 is integrally combined with external teeth 15 used for driving an input, and a carrier 17 that supports a plurality of planetary gears 16 is combined with the shaft of the belt reel 12. In addition, on the outer circumferential side of a ring gear 18 that is engaged with the planetary gears 16, a plurality of ratchet teeth 19 (see FIG. 4) is formed, and the ratchet teeth 19 configure a part of the clutch 20. The clutch 20 appropriately cuts off or connects the powertrain between the motor 10 and the belt reel 12 under the control of the driving force of the motor 10, which is performed by a seat belt control device 21.

The motor-side powertrain 22 of the power transmission mechanism 13 is configured to include a first connect gear 23 having a small diameter, a second connect gear 24 having a large diameter, and first and second idler gears 26 and 27. The first connect gear 23 is constantly engaged with the external teeth 15 that is formed to be integral with the sun gear 14. The second connect gear 24 is disposed at the same shaft as that of the first connect gear 23 so as to be integrally rotated. The first and second idler gears 26 and 27 are constantly engaged with each other so as to transmit power between the second connect gear 24 and the motor gear 25 (that is formed integrally with the rotation shaft 10a of the motor 10). The driving force of the motor 10 in the direction of forward rotation, as denoted by solid-line arrows in FIG. 4, is delivered to the second and first connect gears 24 and 23 through gears 25, 27, and 26, is further delivered to the sun gear 14 through the external teeth 15, and then is delivered to the belt reel 12 through the planetary gears 16 and the carrier 17. The driving force of the motor 10 in the direction of forward rotation rotates the belt reel 12 in a direction (webbing winding direction) retracting the webbing 5. In a state in which the ring gear 18 is fixed, the driving force delivered from the sun gear 14 to the planetary gears 16 allows the planetary gears 16 to revolve. Accordingly, the whole driving force is delivered to the carrier 17 as described above. However, in a state in which the rotation of the ring gear 18 is free, the ring gear 18 revolves in an idling manner, and the planetary gears 16 do not revolve but rotate on its axis. Accordingly, the driving force is not delivered to the carrier 17. As above, the clutch 20 performs an operation of turning the delivery of the motor driving force to the belt reel 12 (carrier 17) ON or OFF by controlling locking or releasing locking of the rotation of the ring gear 18.

Here, the clutch 20 will be described with reference to FIGS. 4 and 5.

The clutch 20 includes a pawl 29, a clutch spring 30, and ratchet teeth 19. The pawl 29 is supported so as to be rotatable by a casing that is not illustrated in the figure and includes an engagement claw 28 in the tip end portion. The clutch spring 30 operates the pawl 29. The ratchet teeth of the ring gear 18 can be engaged with the engagement claw 28 of the pawl 29. When the pawl 29 is operated in the direction of the ratchet teeth 19, the engagement claw 28 bumps into a face that is almost perpendicular to the inclination face of the ratchet teeth 19 so as to lock the rotation of the ring gear 18 in one direction.

In addition, a base portion side of the clutch spring 30 is bent in an arc shape so as to form a curved portion 31. The curved portion 31 is locked in the state of being wound around the outer circumference of the shaft portion of the first connect gear 23. The tip end portion of the clutch spring 30 extends in a direction toward the pawl 29 and is engaged with the operation window 32 of the pawl 29. The curved portion 31 of the clutch spring 30 is engaged with the shaft portion of the first connect gear 23 through friction. When torque equal to or larger than a set value acts between the curved portion 31 and the first connect gear 23, sliding occurs between the curved portion 31 and the first connect gear 23 based on the torque.

In the clutch 20, when the motor 10 rotates in the direction (see solid-line arrows in FIG. 4) of forward rotation, the clutch spring 30 changes from a posture denoted by a solid line in FIG. 5 to a posture denoted by a chain line. Accordingly, the engagement claw 28 of the pawl 29, as illustrated in FIG. 4, is engaged with the ratchet teeth 19 so as to lock the rotation of the ring gear 18. At this time, the ratchet teeth 19 can reliably lock the rotation of the ring gear 18 in one direction. In addition, when the ring gear 18 tries to rotate in the backward direction, a force of a certain level or a higher level is necessary so as to push up the engagement claw 28 by using the ratchet teeth 19. In other words, the clutch spring 30 applies a resistance force of a certain level or a higher level also to the rotation of the ring gear 18 in the backward direction.

When the rotation of the ring gear 18 is locked as above, as described above, all of the rotation force delivered to the sun gear 14 causes the rotation of the carrier 17 so as to be delivered to the belt reel 12 (the state in which the clutch is ON).

On the other hand, when the motor 10 rotates backward from the state in which the clutch is ON, the first connect gear 23 rotates as denoted by a dotted arrow illustrated in FIG. 4 and rotates the clutch spring 30 as denoted by a solid line illustrated in FIG. 5. Accordingly, the engagement claw 28 of the pawl 29 is pulled away from the ratchet teeth 19, whereby the locking of the ring gear 18 is released.

When the locking of the ring gear 18 is released as above, the rotation force delivered to the sun gear 14 rotates the planetary gears 16 on its axis. At this time, the ring gear 18 is allowed to run idle, so that power is not delivered to the carrier 17 (belt reel 12) side (the state in which the clutch is OFF).

As described above, electrical conduction/non-electrical conduction and the amount of electric conduction of the motor 10 that turns the clutch 20 ON/OFF or drives the belt reel 12 to rotate in the winding direction are controlled by the seat belt control device 21. Accordingly, to the seat belt control device 21, as illustrated in FIG. 2, an output signal is input from a current sensor 40 that detects an actual current flowing through the motor 10, and information that is necessary for controlling the motor 10 is input from a vehicle behavior control device 100 thereto. The information input to the seat belt control device 21 from the vehicle behavior control device 100 includes outputs of sensors including a longitudinal G (longitudinal g-force) sensor 101, a lateral G (lateral g-force) sensor 105, and a yaw rate sensor 106, a steady-state yaw rate deviation $\Delta\omega\text{ff}$ and a boundary yaw rate deviation $\Delta\omega\text{fb}$ both calculated by a brake control unit 102, and a prefill control amount of a prefill control unit 190 (see FIG. 6).

In addition, in this embodiment, the movement state of the vehicle includes a longitudinal G, a lateral G, a yaw rate, a steady-state yaw rate deviation $\Delta\omega\text{ff}$, and a boundary yaw rate deviation $\Delta\omega\text{fb}$.

Here, the vehicle behavior control device 100 will be described with reference to FIGS. 6 to 13.

Figure 6:
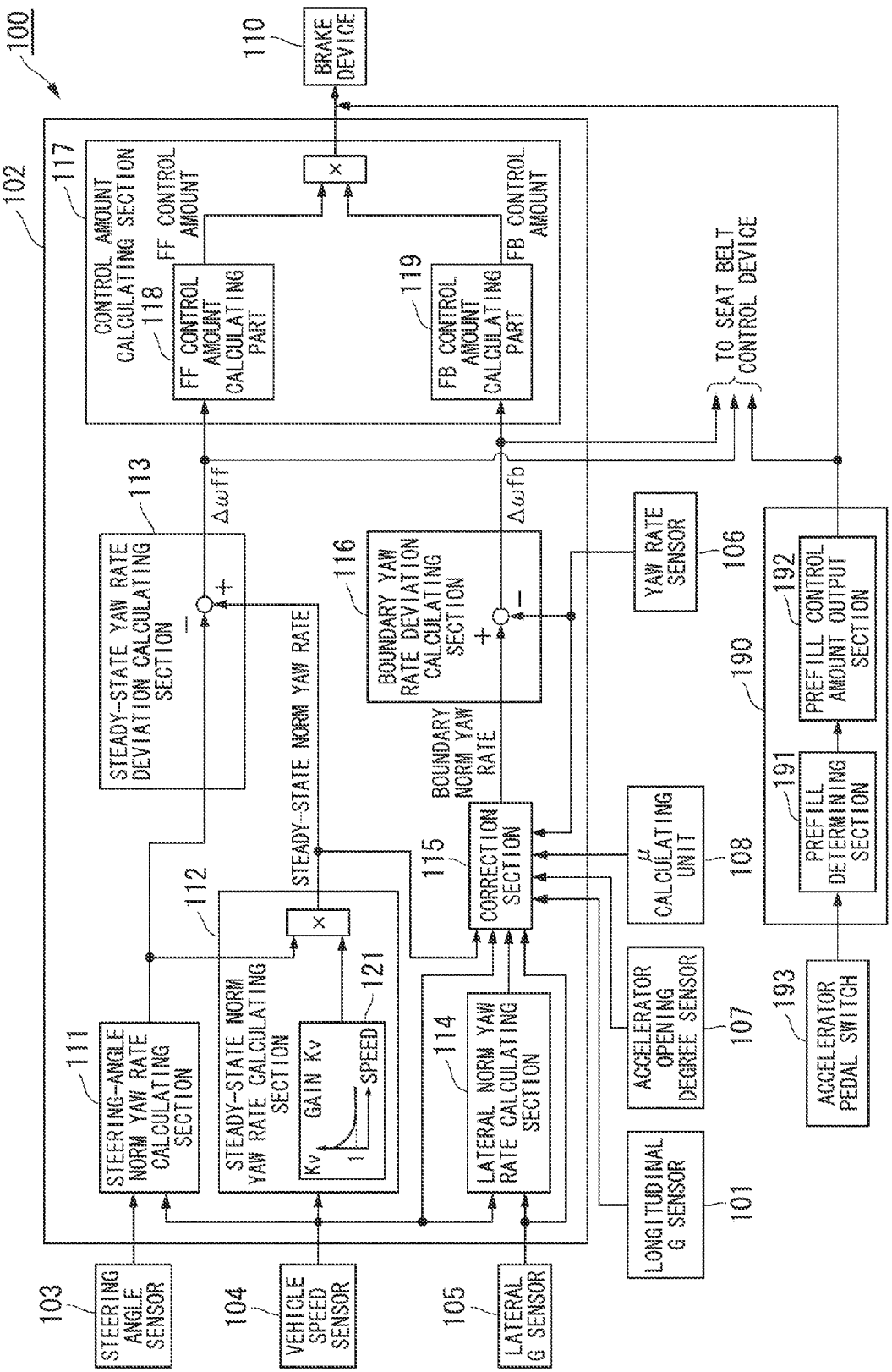
FIG. 6 is a control block diagram of a vehicle behavior control device according to the above-described embodiment.

FIG. 6 is a control block diagram of the vehicle behavior control device 100.

The vehicle behavior control device 100 includes a brake control unit 102 and a brake device 110. The brake device 110 includes a prefill control unit (precompressing unit) 190.

The brake control unit 102 determines braking force control amounts of the left and right front wheels and the left and right rear wheels in accordance with the driving state of the vehicle. The prefill control unit 190 determines control amounts that are necessary for precompressing liquid pressure of wheel cylinders (not illustrated in the figure) during non-operation of an accelerator pedal. The brake device 110 controls the pressure of the liquid inside the wheel cylinder of each vehicle wheel based on the braking force control amounts of vehicle wheels that are determined by the brake control unit 102. In addition, the brake device 110 controls the pressure of the liquid inside the wheel cylinder based on the prefill control amount that is determined by the prefill control unit 190.

The prefill control controls liquid pressure of the wheel cylinder and is performed for decreasing a delay in the braking effect. In other words, the prefill control is performed such that predetermined pressure is applied to the liquid disposed inside the wheel cylinder when a vehicle occupant removes his/her foot from the accelerator pedal, and a state is formed before a foot is placed on a brake pedal in which there is hardly a gap between a disk rotor and a brake pad. By performing this prefill control, it is possible to rapidly raise the pressure of the liquid disposed inside the wheel cylinder when a foot is placed on the brake pedal.

The prefill control unit 190 includes a prefilling-determining section 191 and a prefill control amount output section 192.

The prefilling-determining section 191 determines whether to perform prefill control based on an output signal of an accelerator pedal switch 193 or the like. Described in detail, the accelerator pedal switch (gas pedal switch) 193 outputs an on signal to the prefilling-determining section 191 when a vehicle occupant places his/her foot on the accelerator pedal (gas pedal) and outputs an OFF signal to the prefilling-determining section 191 when the vehicle occupant removes his/her foot from the accelerator pedal. When the output signal of the accelerator pedal switch 193 is switched from ON to OFF, the prefilling-determining section 191 outputs an instruction signal used for performing prefill control to the prefill control amount output section 192. In addition, when a foot is placed on the brake pedal, or when a predetermined time elapses after the start of prefill control, the prefilling-determining section 191 outputs an instruction signal used for ending the prefill control to the prefill control amount output section 192.

In a case where an instruction signal used for performing the prefill control is input from the prefilling-determining section 191, the prefill control amount output section 192 outputs a control amount (prefill control amount), which is necessary for precompressing the liquid disposed inside the wheel cylinder so as to form a state in which there is hardly a gap between the disk rotor and the brake pad (both are not illustrated in the figure), to the brake device 110. Then, the prefill control amount output section 192 continues to perform the prefill control until an instruction signal used for ending the prefill control is input from the prefilling-determining section 191. Hereinafter, a state in which the prefill control is performed will be referred to as during a prefill operation. Then, when an instruction signal used for ending the prefill control is input from the prefilling-determining section 191, the prefill control amount output section 192 ends the performance of the prefill control by outputting a control amount of "0" to the brake device 110. Hereinafter, a state in which the prefill control is not performed will be referred to as during a non-prefill operation.

The control amount signal that is output from the prefill control amount output section 192 is also output to the seat belt control device 21.

Next, the brake control unit 102 will be described in detail. Detection signals corresponding to detection values of various sensors are input to the brake control unit 102. More specifically, detection signals corresponding to detection values are input to the brake control unit 102 from a steering angle sensor 103, a vehicle speed sensor 104, a lateral acceleration sensor (hereinafter, abbreviated as a lateral G sensor) 105, a longitudinal acceleration sensor (hereinafter, abbreviated as a longitudinal G sensor) 101, a yaw rate sensor 106, and an accelerator opening degree sensor 107, where:

the steering angle sensor 103 detects at least one of the steering wheel angle and the steering amount of the steering wheel of the vehicle;

the vehicle speed sensor 104 detects the speed of the vehicle;

the lateral acceleration sensor (hereinafter, abbreviated as a lateral G sensor) 105 detects the acceleration of the vehicle in the leftward/rightward direction (vehicle widthwise direction), that is, the lateral acceleration (hereinafter, abbreviated as lateral G);

the longitudinal acceleration sensor (hereinafter, abbreviated as a longitudinal G sensor) 101 detects the acceleration of the vehicle in the forward/backward direction, that is, the longitudinal acceleration (hereinafter, abbreviated as longitudinal G);

the yaw rate sensor 106 detects the yaw rate of the vehicle; and the accelerator opening degree sensor 107 detects the opening degree of the accelerator of the vehicle.

In addition, from a μ-calculating unit 108 that calculates a friction coefficient between the vehicle wheels of the vehicle and the road surface, an electric signal according to the calculated friction coefficient is input to the brake control unit 102.

The brake control unit 102 includes a steering-angle norm yaw rate-calculating section 111, a steady-state norm yaw rate-calculating section 112, a steady-state yaw rate deviation-calculating section 113, a lateral G-norm yaw rate-calculating section 114, a correction section 115, a boundary yaw rate deviation-calculating section 116, and a control amount-calculating section 117. The control amount-calculating section 117 includes a feed-forward control amount-calculating part (hereinafter, abbreviated as an FF control amount-calculating part) 118 and a feedback control amount-calculating part (hereinafter, abbreviated as an FB control amount-calculating part) 119.

In addition, in this embodiment, the longitudinal G sensor 101, the lateral G sensor 105, the yaw rate sensor 106, the steady-state yaw rate deviation-calculating section 113, and the boundary yaw rate deviation-calculating section 116 configure a detection unit that detects the movement state of the vehicle.

The steering-angle norm yaw rate-calculating section 111 calculates a steering-angle norm yaw rate based on a steering angle that is detected by the steering angle sensor 103 and a vehicle speed that is detected by the vehicle speed sensor 104. When a driver wants to aggressively turn the vehicle, the driver sets the steering angle to be large, and accordingly, the steering angle norm yaw rate is high. In other words, when the steering-angle norm yaw rate that is calculated based on the steering angle is high, it can be estimated that the driver's steering intention desiring to turn the vehicle is strong.

The steady-state norm yaw rate-calculating section 112 calculates a steady-state norm yaw rate gain Kv according to the vehicle speed by referring to a steady-state norm yaw rate gain table 121 and calculates a steady-state norm yaw rate $\omega\_high$ by multiplying the steering-angle norm yaw rate by a steady-state norm yaw rate gain Kv. In the steady-state norm yaw rate gain table 121 according to this embodiment, the horizontal axis is the vehicle speed, the vertical axis is the steady-state norm yaw rate gain Kv, the steady-state norm yaw rate gain Kv converges on one as the vehicle speed increases, and the steady-state norm yaw rate gain Kv increases as the vehicle speed decreases. In this embodiment, it is set such that the steady-state norm yaw rate gain Kv is larger than one in a low speed region in which the vehicle speed, for example, is equal to or less than 40 km/h, and the steady-state norm yaw rate gain Kv is one when the vehicle speed is higher than that.

The steady-state yaw rate deviation-calculating section 113 calculates a steady-state yaw rate deviation $\Delta\omega ff$ by subtracting the steering-angle norm yaw rate from the steady-state norm yaw rate $\omega\_high$. Accordingly, at the time of a vehicle speed at which the steady-state norm yaw rate gain Kv=1, the steady-state norm yaw rate $\omega\_high$ is the same as the steering-angle norm yaw rate, and accordingly, the steady-state yaw rate deviation $\Delta\omega ff$ is zero. In other words, only at the time of a low vehicle speed at which the steady-state norm yaw rate gain Kv is larger than one, the steady-state yaw rate deviation $\Delta\omega ff$ occurs as a positive value.

The lateral G-norm yaw rate-calculating section 114 calculates a lateral G-norm yaw rate $\omega\_low$ based on the lateral G that is detected by the lateral G sensor 105 and a vehicle speed that is detected by the vehicle speed sensor 104. The lateral G-norm yaw rate $\omega\_low$ is a yaw rate that can be generated by the current lateral G and, for example, is represented by $\omega\_low=Gy/V$. Here, Gy is a detection value of the lateral acceleration detected by the lateral G sensor 5, and V is a vehicle speed that is detected by the vehicle speed sensor 4.

The correction section 115 calculates a boundary norm yaw rate $\omega\_TAR$ based on the steady-state norm yaw rate $\omega\_high$ and the lateral G-norm yaw rate $\omega\_low$. A method of calculating the boundary norm yaw rate $\omega\_TAR$ by using the correction section 115 will be described next in detail.

The boundary yaw rate deviation-calculating section 116 calculates a boundary yaw rate deviation $\Delta\omega fb$ by subtracting the yaw rate (actual yaw rate) that is detected by the yaw rate sensor 106 from the boundary norm yaw rate $\omega\_TAR$.

The steady-state yaw rate deviation $\Delta\omega ff$ that is calculated by the steady-state yaw rate deviation-calculating section 113 and the boundary yaw rate deviation $\Delta\omega fb$ that is calculated by the boundary yaw rate deviation-calculating section 116 are output to the seat belt control device 21 so as to control the amount of conduction in the motor 10.

In the control amount-calculating section 117, the FF control amount-calculating part 118 calculates a feed-forward control amount (hereinafter, abbreviated as an FF control amount) based on the steady-state yaw rate deviation $\Delta\omega ff$, and the FB control amount-calculating part 119 calculates a feedback control amount (abbreviated as an FB control amount) based on the boundary yaw rate deviation $\Delta\omega fb$. Subsequently, the control amount-calculating section 117 calculates a total control amount by adding the FF control amount and the FB control amount and outputs the total control amount to the brake device 110 as an instruction value. A method of calculating the total control amount by using the control amount-calculating section 117 will be described next in detail.

Next, the method of calculating the boundary norm yaw rate ω_TAR by using the correction section 115 will be described with reference to FIGS. 7 to 12.

Figure 7:
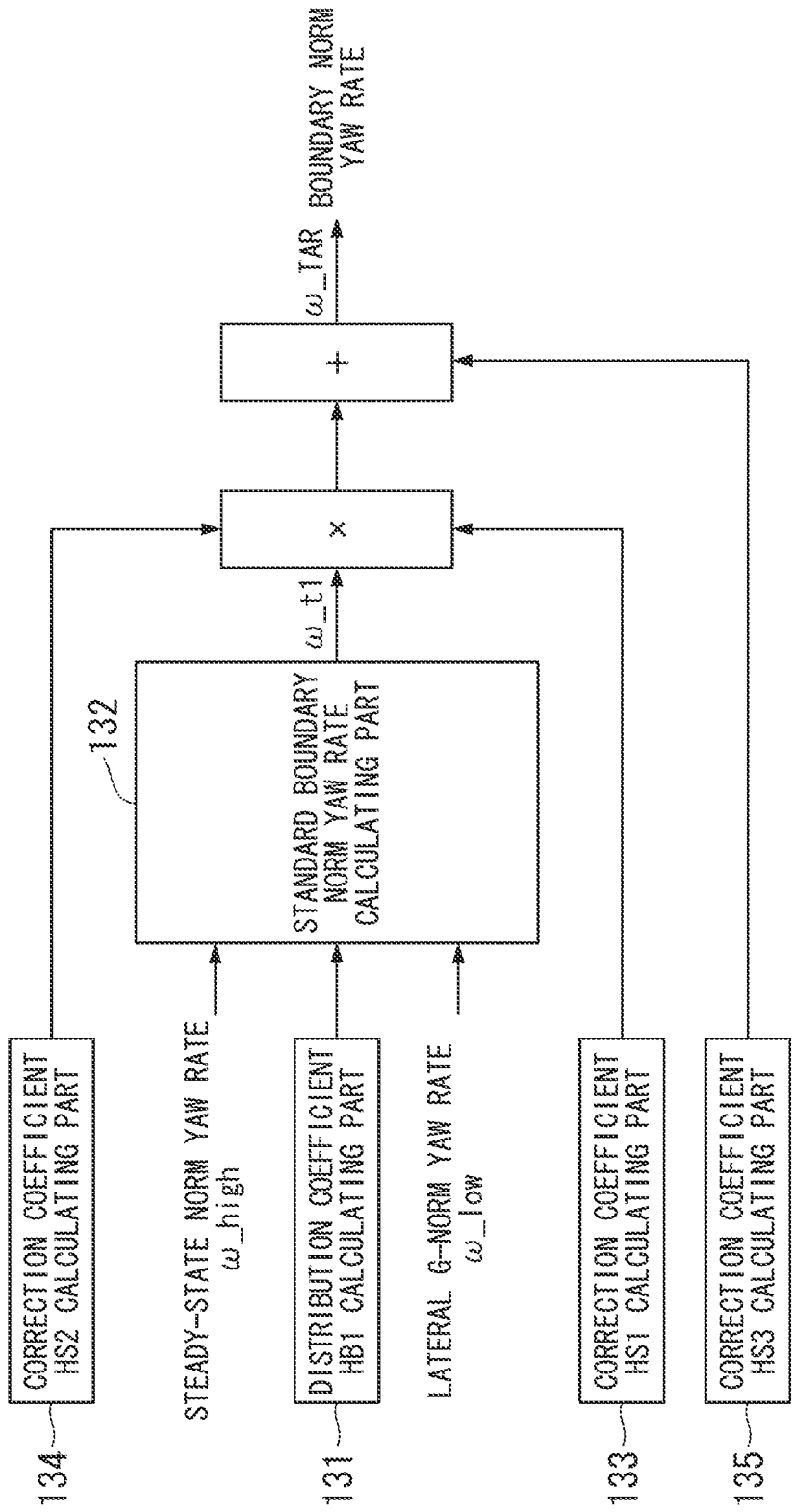
FIG. 7 is a block diagram of a correction unit according to the above-described embodiment.

The correction section 115, as illustrated in FIG. 7, includes a distribution coefficient HB1-calculating part 131, a standard boundary norm yaw rate-calculating part 132, a correction coefficient HS1-calculating part 133, a correction coefficient HS2-calculating part 134, and a correction coefficient HS3-calculating part 135.

In the correction section 115, the standard boundary norm yaw rate-calculating part 132 calculates a standard boundary norm yaw rate ω_t1 based on a distribution coefficient HB1 that is calculated by the distribution coefficient HB1-calculating part 131, the steady-state norm yaw rate ω_high, and the lateral G-norm yaw rate ω_low. In addition, the standard boundary norm yaw rate ω_t1 is multiplied by the correction coefficients HS1 and HS2 that are calculated by the correction coefficient HS1-calculating part 133 and the correction coefficient HS2-calculating part 134, and the correction coefficient HS3 that is calculated by the correction coefficient HS3-calculating part 135 to the result, whereby the boundary norm yaw rate ω_TAR is calculated.

$$\omega\_TAR = \omega\_t1 \times HS1 \times HS2 + HS3 \quad \text{Equation (1)}$$

The boundary norm yaw rate ω_TAR becomes a yaw rate target value in feedback control.

Described in detail, the standard boundary norm yaw rate-calculating part 132 corrects the lateral G-norm yaw rate ω_low as a target value in the feedback control of conventional vehicle behavior control in an increasing direction in association with the steady-state norm yaw rate ω_high that is calculated based on the steering angle, thereby calculating the standard boundary norm yaw rate ω_t1. Accordingly, both control for stabilizing a yaw moment occurring in the vehicle body and control for improving the responsiveness of steering are achieved.

Figure 8:
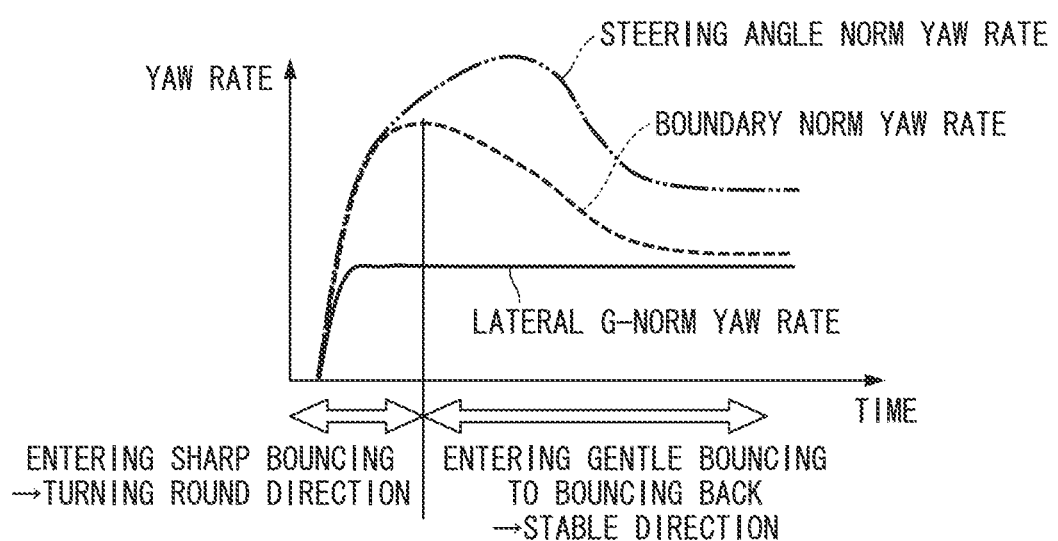
FIG. 8 is a diagram that illustrates the relationship between a lateral G-norm yaw rate, a steering-angle norm yaw rate, and a boundary norm yaw rate.

Here, the correction for increasing the lateral G-norm yaw rate will be described with reference to FIG. 8. FIG. 8 illustrates changes in the steering-angle norm yaw rate and the lateral G-norm yaw rate in time from a straight advancing state until a predetermined steering angle is maintained by rotating the steering wheel. Normally, the steering-angle norm yaw rate is higher than the lateral G-norm yaw rate as above. Thus, in order to make a correction for increasing the lateral G-norm yaw rate, a method is used in which the lateral G-norm yaw rate is corrected so as to approach the steering-angle norm yaw rate. Here, the degree of approach of the lateral G-norm yaw rate to the steering-angle norm yaw rate is adjusted in accordance with the driving state. As a unit that performs such adjustment, a concept of a distribution coefficient of the lateral G-norm yaw rate and the steering-angle norm yaw rate is employed.

In this embodiment, this concept is further developed, and, as a method of correcting the lateral G-norm yaw rate to be increased, the lateral G-norm yaw rate is corrected so as to approach the steady-state norm yaw rate ω_high that is calculated based on the steering-angle norm yaw rate.

Described in detail, in this embodiment, a standard boundary norm yaw rate ω_t1 is calculated using Equation (2) based on the distribution coefficient HB1 that is calculated based on the distribution coefficient HB1-calculating part 131, the lateral G-norm yaw rate ω_low, and the steady-state norm yaw rate ω_high.

$$\omega\_t1 = HB1 \times \omega\_high + (1 - HB1) \times \omega\_low \quad \text{Equation (2)}$$

Here, the distribution coefficient HB1 is a numeric value in the range of 0 to 1. In a case where HB1=0, the standard boundary norm yaw rate ω_t1 is the lateral G-norm yaw rate ω_low. In a case where HB1=1, the standard boundary norm yaw rate ω_t1 is the steady-state norm yaw rate ω_high.

Next, the distribution coefficient HB1 that is calculated by the distribution coefficient HB1-calculating part 131 will be described with reference to FIG. 9.

The distribution coefficient HB1 is calculated by multiplying distribution coefficients HB1a, HB1b, HB1c, and HB1d together. Here, the distribution coefficient HB1a is calculated in accordance with the vehicle speed, the distribution coefficient HB1b is calculated in accordance with the ratio of change in the yaw rate, the distribution coefficient HB1c is calculated in accordance with the integral of a yaw rate deviation, and the distribution coefficient HB1d is calculated in accordance with the steering speed.

$$HB1 = HB1a \times HB1b \times HB1c \times HB1d \quad \text{Equation (3)}$$

Figure 9:
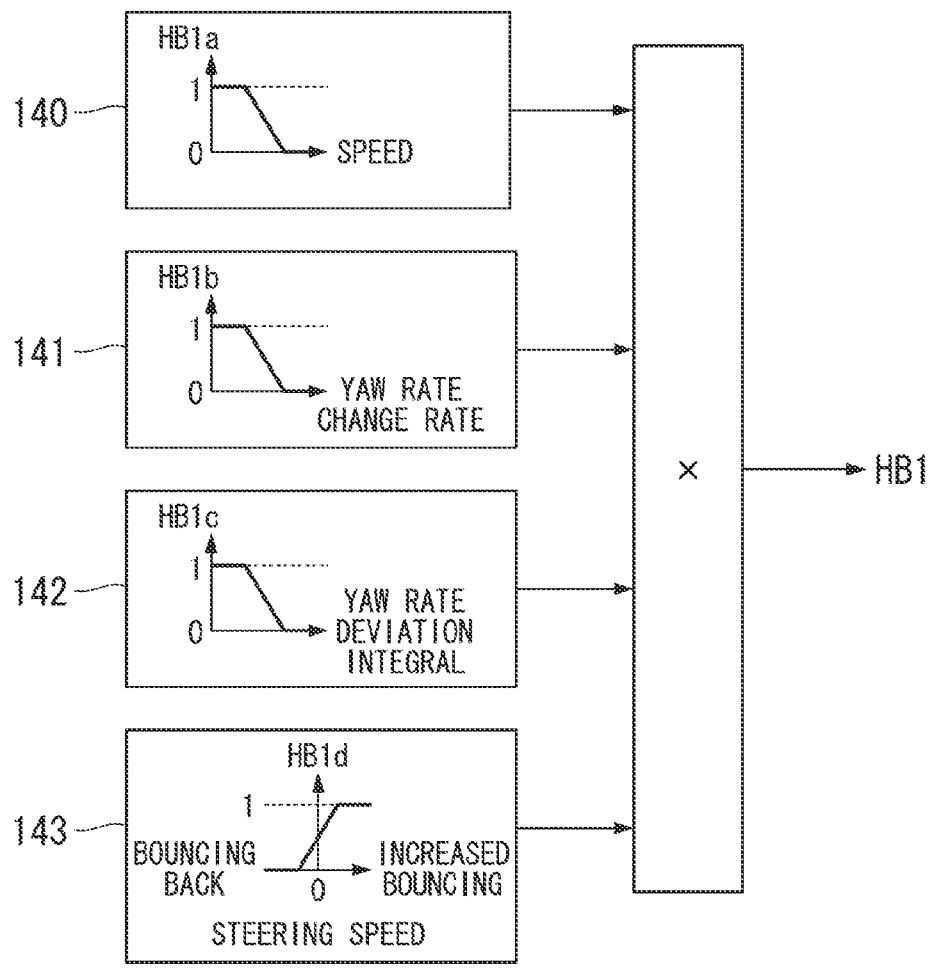
FIG. 9 is a diagram that illustrates a method of calculating a distribution coefficient HB1 according to the above-described embodiment.

The distribution coefficients HB1a, HB1b, HB1c, and HB1d are calculated by referring to distribution coefficient tables 140, 141, 142, and 143 illustrated in FIG. 9. The distribution coefficient tables 140, 141, 142, and 143 according to this embodiment will now be described.

In the distribution coefficient table 140 used for calculating the distribution coefficient HB1a, the horizontal axis is the vehicle speed, and the vertical axis is the distribution coefficient HB1a. In this distribution coefficient table 140, HB1a is constant as HB1a=1 in a low vehicle speed region. In a case where the vehicle speed is equal to or higher than an arbitrary threshold value (predetermined value) that is set in advance, the distribution coefficient HB1a gradually decreases as the vehicle speed increases. In a high-speed region, HB1a is constant as HB1a=0. Accordingly, when the vehicle speed is low, the boundary norm yaw rate ω_TAR as a target value is set to be high in the FB control amount-calculating part 119 so as to improve the turning round characteristic and the followability, and, when the vehicle speed is high, the boundary norm yaw rate ω_TAR as a target value is set not to be high in the FB control amount-calculating part 119 so as to acquire stability of the vehicle behavior.

In the distribution coefficient table 141 used for calculating the distribution coefficient HB1b, the horizontal axis is the rate of change in the yaw rate, and the vertical axis is the distribution coefficient HB1b. In this distribution coefficient table 141, HB1b is constant as HB1b=1 in a low yaw rate change rate region. In a case where the yaw rate change rate is equal to or higher than an arbitrary threshold value (predetermined value) that is set in advance, the distribution coefficient HB1b gradually decreases as the yaw rate change rate increases. In a high yaw rate change region, HB1a is constant as HB1b=0. Here, the yaw rate change rate is a change in the actual yaw rate, which is detected by the yaw rate sensor 106, in time and can be calculated by differentiating the actual yaw rate with respect to time. For example, at a time when violent slalom driving is performed, at a time when the vehicle behavior is unstable, or the like, a high yaw rate change rate appears. At such a time, the boundary norm yaw rate ω_TAR as a target value should not set to be high in the FB control amount-calculating part 119, and accordingly, when the yaw rate change rate is high, the distribution coefficient HB1b is set to a small value, whereby the boundary norm yaw rate ω_TAR is not high.

In the distribution coefficient table 142 used for calculating the distribution coefficient HB1c, the horizontal axis is the integral value of the yaw rate deviation, and the vertical axis is the distribution coefficient HB1c. In this distribution coefficient table 142, HB1c is constant as HB1c=1 in the region of a small integral value of the yaw rate deviation. In a case where the integral value of the yaw rate deviation is equal to or higher than an arbitrary threshold value (predetermined value) that is set in advance, the distribution coefficient HB1c gradually decreases as the integral value of the yaw rate deviation increases. In the region of a large integral value of the yaw rate deviation, HB1c is constant as HB1c=0.

Here, an integral value of the yaw rate deviation is a value acquired by integrating a deviation between the boundary norm yaw rate and the actual yaw rate detected by the yaw rate sensor 106, that is, the boundary yaw rate deviation Δωfb from a time when steering is started. For example, even when the boundary yaw rate deviation Δωfb is small, in a case where the state is continued for a long time, the integral value of the yaw rate deviation is large. In such a case, since there is a possibility that the vehicle is not slow but in a state of being slowly spun, the boundary norm yaw rate ω_TAR as a target value should not be set to be large in the FB control amount-calculating part 119. Accordingly, when the integral value of the yaw rate deviation is large, the distribution coefficient HB1c is set to a small value, so that the boundary norm yaw rate ω_TAR is not high.

In the distribution coefficient table 143 used for calculating the distribution coefficient HB1d, the horizontal axis is the steering speed, and the vertical axis is the distribution coefficient HB1d.

In this distribution coefficient table 143, the higher a steering speed is, the larger a distribution coefficient HB1d is, and, the distribution coefficient HB1d in the case of a positive steering speed is set to be larger than that in the case of a negative steering speed. Here, the steering speed is a value that is determined based on the amount of change in the steering angle per unit time that is detected by the steering angle sensor 3 and the steering angle and can be calculated by taking a time derivative of the steering angle and comparing the result with the steering angle. The case of a positive steering speed is acquired when, in a state in which the steering wheel is rotated in a direction separating from the neutral position (straight advancement direction), there is an amount of change per unit time toward the same direction and when, in a state in which the steering wheel is rotated toward the neutral position (straight advancement direction), there is an amount of change per unit time toward the same direction. The case of a negative steering speed is acquired when, in a state in which the steering wheel is rotated in a direction separating from the neutral position (straight advancement direction), there is an amount of change per unit time in a direction toward the neutral position and when, in a state in which the steering wheel is rotated in a direction returning to the neutral position, there is an amount of change per unit time in a direction separating from the neutral position.

In a case where the steering speed is positive, it can be estimated that the driver has a high operation intention for greatly turning the vehicle, and accordingly, the higher the steering speed is, the greater value the distribution coefficient HB1d is set to (the maximum value is constant as HB1d=1), so that the boundary norm yaw rate ω_TAR is high. Accordingly, the responsiveness of the steering is improved. On the other hand, in a case where the steering speed is negative, it can be estimated that the driver is in the state of desiring to converge the operation, and thus, the greater the absolute value of the steering speed is, the smaller value the distribution coefficient HB1d is set to (the minimum value is constant as HB1d=0), so that the boundary norm yaw rate ω_TAR is not high.

Through this, the responsiveness of the steering is improved when an operation of avoiding a front-side object, lane changing, or the like is performed.

In addition, the distribution coefficient HB1d may be calculated based on at least one of the turning angle and the steering amount instead of the steering speed. The reason for this is that the larger the turning angle is, the higher the operation intention of the driver for aggressively turning the vehicle can be estimated. The turning angle in this case has the same meaning as that of the steering angle.

Next, the correction coefficient HS1 that is calculated by the correction coefficient HS1-calculating part 133 will be described with reference to FIG. 10.

This correction coefficient HS1 is a correction coefficient in consideration of a time when a driver performs an operation of turning the vehicle by turning the handle with the vehicle preloaded or the like.

Figure 10:
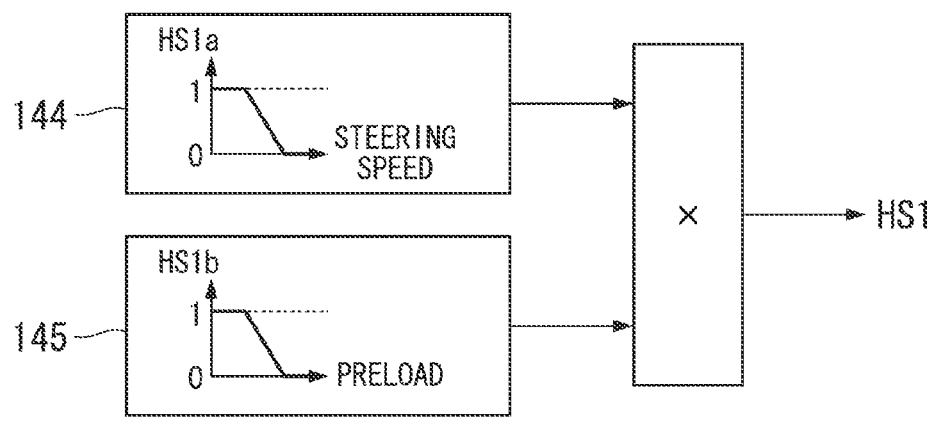
FIG. 10 is a diagram that illustrates a method of calculating a correction coefficient HS1 according to the above-described embodiment.

As illustrated in FIG. 10, the correction coefficient HS1 is calculated by multiplying a correction coefficient HS1a that is calculated in accordance with the steering speed and a correction coefficient HS1b that is calculated in accordance with the preload of the vehicle.

$$HS1 = HS1a \times HS1b \qquad \text{Equation (4)}$$

The preload of a vehicle is the amount of movement of the load to the front side of the vehicle and, for example, can be estimated by the longitudinal G sensor 101 that detects the acceleration of the vehicle in the longitudinal direction.

The correction coefficients HS1a and HS1b are calculated by referring to correction coefficient tables 144 and 145 illustrated in FIG. 10. The correction coefficient tables 144 and 145 according to the present embodiment will now be described.

In the correction coefficient table 144 used for calculating the correction coefficient HS1a, the horizontal axis is the steering speed, and the vertical axis is the correction coefficient HS1a. In this correction coefficient HS1a table 144, the correction coefficient HS1a is constant as HS1a=1 in a low steering speed region. In a case where the steering speed is equal to or higher than an arbitrary threshold value (predetermined value) that is set in advance, the correction coefficient HS1a gradually decreases as the steering speed increases. In a high steering speed region, the correction coefficient HS1a is constant as HS1a=0.

In the correction coefficient table 145 used for calculating the correction coefficient HS1b, the horizontal axis is the preload (the amount of movement to the front side of the vehicle), and the vertical axis is the correction coefficient HS1b. In this correction coefficient HS1b table 145, the correction coefficient HS1b is constant as HS1b=1 in a low preload region. In a case where the preload is equal to or higher than an arbitrary threshold value (predetermined value), the correction coefficient HS1b gradually decreases as the preload increases. In a high preload region, the correction coefficient HS1b is constant as HS1b=0.

As described above, in a case where the handle is turned with the vehicle preloaded, it is easy to turn the vehicle. However, as the preload increases, the behavior of the vehicle may easily become unstable. In addition, the higher the steering speed is, the more easily the behavior of the vehicle becomes unstable. The correction coefficient HS1 is a correction coefficient that is used for adjusting the boundary norm yaw rate ω_TAR at the time of the steering.

Since the correction coefficient HS1 is calculated as above, as a result, the correction coefficient HS1 is one in a low steering speed region and a low preload region. Accordingly, the boundary norm yaw rate ω_TAR is configured to be high, and therefore, the turning round characteristic can be improved. In contrast to this, as the steering speed and the preload increase, the correction coefficient HS1 becomes smaller than one. Accordingly, the boundary norm yaw rate ω_TAR can be configured to be low, therefore, the stability of the vehicle behavior can be secured.

Next, the correction coefficient HS2 that is calculated by the correction coefficient HS2 calculating section 34 will be described.

This correction coefficient HS2 is a correction coefficient in consideration of a case where a lane is changed over (steering is performed, and immediately the vehicle is returned to the original traveling direction) to a road surface (hereinafter, abbreviated as a high-μ lane) having a high coefficient of friction (hereinafter, abbreviated as μ) between the vehicle wheels and the road surface.

The correction coefficient HS2 is a gain that is configured such that a maximum value is set to one, and a predetermined decrease counting value is subtracted from its initial value in a case where one condition of (a) to (d) represented below is satisfied, and a predetermined increase counting value is added thereto toward one in a case where any condition of (a) to (d) represented below is not satisfied.
(a) when the coefficient μ of friction is determined to be high (or longitudinal or lateral acceleration corresponding to the driving for a road surface having a high coefficient of friction is detected)
(b) when the steering angle is determined to be large
(c) when the rate of decrease in the lateral G is determined to be high
(d) when the rate of decrease in yaw rate is determined to be high In addition, the correction coefficient HS2 may be configured such that a predetermined decrease counting value is subtracted from the initial value in a case where two or more arbitrary conditions out of (a) to (d) described above are satisfied, and a predetermined increase counting value is added toward one in a case where two or more conditions are not satisfied. Particularly, in consideration of the convergence of the vehicle behavior at a time when the coefficient of friction between the vehicle wheels and the road surface is high, it is preferable that a combination of (a) described above and any of (b) to (d) be used.

The coefficient μ of friction is calculated by a μ-calculating unit 8. In addition, the lateral G decrease rate is the speed of decrease in the lateral G and can be calculated based on the lateral G that is detected by the lateral G sensor 5. The yaw rate-decreasing rate is the speed of decrease in the actual yaw rate that is detected by the yaw rate sensor 6.

Figure 11:
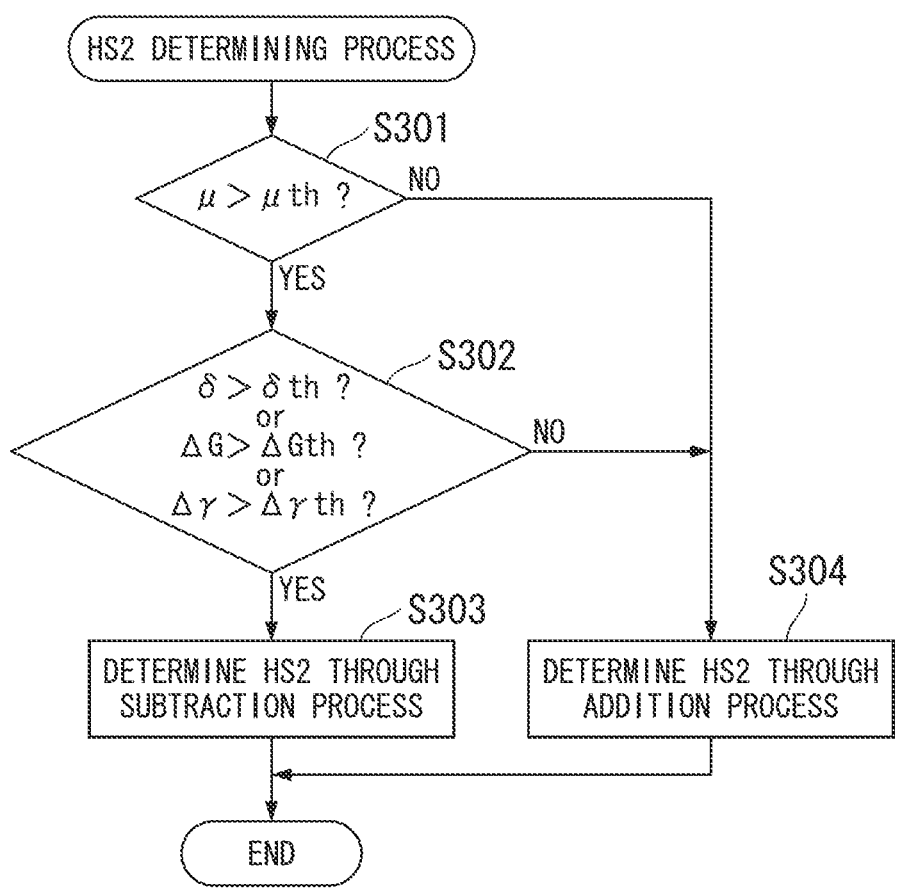
FIG. 11 is a flowchart that illustrates a process of determining a correction coefficient HS2 according to the above-described embodiment.

An example of the process of determining a correction coefficient HS2 will be described in accordance with a flowchart illustrated in FIG. 11.

First, in Step S301, it is determined whether or not the coefficient of friction is larger than a threshold value μth.

In a case where the determination result made in Step S301 is "YES" (μ>μth), the process proceeds to Step S302, and it is determined whether or not at least one of whether the steering angle δ is larger than a threshold value δth (δ>δth), whether the lateral G decreasing rate ΔG is larger than a threshold value ΔGth (ΔG>ΔGth), and whether the yaw rate-decreasing rate γ is larger than a threshold value γth (γ>γth).

In a case where the determination result made in Step S302 is "YES", the process proceeds to Step S303, and the correction coefficient HS2 is determined through a subtraction process, and the execution of this routine temporality ends. In this subtraction process, a predetermined subtraction counting value is repeatedly subtracted from the initial value of the correction coefficient HS2, so that the correction coefficient HS2 converges on zero.

On the other hand, in a case where the determination result made in Step S301 is "NO" (μ≤μth) and in a case where the determination result made in Step S302 is "NO", the process proceeds to Step S304, and the correction coefficient HS2 is determined through an addition process, and the execution of this routine temporarily ends. In this addition process, a predetermined increase counting value is repeatedly added, so that the correction coefficient HS2 converges on one.

The initial value of the correction coefficient HS2 is an arbitrary value between zero and one.

When the vehicle lane is changed over on a high μ road, in a case where the yaw rate and the lateral G sharply decrease, there is a case where a high yaw rate occurs in a direction opposite to the direction in which the direction of the traveling through steering. At this time, when the boundary norm yaw rate ω_TAR is set to be high, there is concern that the tracing characteristic of the vehicle for steering may be degraded. The correction coefficient HS2 is used for suppressing this. In other words, in a case where the coefficient μ of friction, the steering angle, the lateral G decreasing rate, and the yaw rate-decreasing rate are large, the correction coefficient HS2 is set to a small value. Through this, the boundary norm yaw rate ω_TAR is configured not to be high, and accordingly, the convergence of the yaw rate after the lane is changed over is improved.

Next, the correction coefficient HS3 that is calculated by the correction coefficient HS3-calculating part 135 will be described with reference to FIG. 12.

When the driver suddenly returns the accelerator during the turning of the vehicle, there is a case where a phenomenon occurs in which the vehicle is preloaded so as to enter the inner side of the turning. The correction coefficient HS3 is a correction coefficient in consideration of a reaction for turning off the output of the vehicle during such turning. Depending on a driver, there is a case where a turning operation is aggressively performed by using such a reaction. However, the turning operation using this reaction, the vehicle behavior may be easily unstable when the accelerator is open from when torque required for the vehicle is large (in other words, the degree of opening of the accelerator is high) or when the vehicle speed is high. The correction coefficient HS3 is a correction coefficient that is used for adjusting the boundary norm yaw rate ω_TAR at a time when there is a reaction for the turning off the output of the vehicle during turning.

Figure 12:
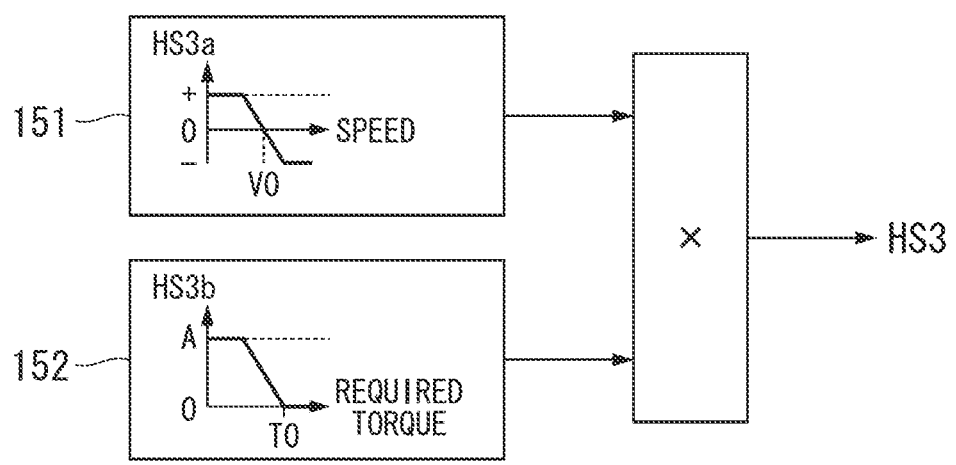
FIG. 12 is a diagram that illustrates a method of calculating a correction coefficient HS3 according to the above-described embodiment.

As illustrated in FIG. 12, the correction coefficient HS3 is calculated by multiplying the correction coefficient HS3a that is calculated in accordance with the vehicle speed and the correction coefficient HS3b that is calculated in accordance with the torque required for the vehicle.

$$HS3 = HS3a \times HS3b \qquad \text{Equation (6)}$$

In addition, the torque required by the vehicle can be calculated based on the degree of opening of the accelerator that is detected by the accelerator opening degree sensor 107.

The correction coefficients HS3a and HS3b are calculated by referring to the correction coefficient tables 151 and 152 that are illustrated in FIG. 12. The correction coefficient tables 151 and 152 according to this embodiment will be described.

In the correction coefficient table 151 that is used for calculating the correction coefficient HS3a, the horizontal axis is the vehicle speed, and the vertical axis is the correction coefficient HS3a. In this correction coefficient HS3a table 151, the correction coefficient HS3a is a predetermined positive value in a region in which the vehicle speed is lower than an arbitrary threshold value (predetermined value) set in advance. When the vehicle speed is equal to or higher than the above-described threshold value (predetermined value), the correction coefficient HS3a gradually decreases as the vehicle speed increases. Then, when the vehicle speed excess speed V0, the correction coefficient HS3a is a negative value. In a region in which the vehicle speed is very high, the correction coefficient HS3a is a predetermined negative value.

In the correction coefficient table 152 that is used for calculating the correction coefficient HS3b, the horizontal axis is the torque required for the vehicle, and the vertical axis is the correction coefficient HS3b. In this correction coefficient HS3b table 152, the correction coefficient HS3b is a predetermined positive value in a region in which the torque required for the vehicle is smaller than an arbitrary threshold value (predetermined value) T0 set in advance. In a region in which the required torque is equal to or higher than the threshold value (predetermined value) T0 set in advance, the correction coefficient HS3b=0. Here, the above-described threshold value (predetermined value) T0 is an extremely small value, and, for example, is set to a required torque corresponding to when the degree of opening of the accelerator is close to zero.

By setting the correction coefficient tables 151 and 152 as above, the following advantages are acquired.

First, a case will be described in which the required torque is equal to or larger than the above-described threshold value (predetermined value) T0 (in other words, when it is determined that a reaction for turning off the output of the vehicle during turning does not occur). In such a case, the correction coefficient HS3 is zero regardless of the magnitude of the vehicle speed, and it is possible that the boundary norm yaw rate $\omega\_TAR$ is not corrected.

Next, a case will be described in which the required torque is equal to or less than the above-described threshold value (predetermined value) T0 (in other words, it is determined that a reaction for turning off the output of the vehicle during turning occurs). In such a case, when the vehicle speed is lower than V0, the correction coefficient HS3 is a positive value, and the boundary norm yaw rate $\omega\_TAR$ can be configured to be high. On the other hand, in a case where the vehicle speed is equal to or higher than V0, the correction coefficient HS3 is a negative value, and accordingly, the boundary norm yaw rate $\omega\_TAR$ can be configured to be low. In addition, in a case where the vehicle speed is lower than V0, when the required torque is constant, the lower the vehicle speed is, the larger positive value the correction coefficient HS3 is set to, and accordingly, the boundary norm yaw rate $\omega\_TAR$ can be configured to be high. Through this, the turning round characteristic at a time when a reaction for turning off the output of the vehicle during turning at a low or middle speed occurs can be improved. On the other hand, in a case where the vehicle speed is equal to or higher than V0, when the required torque is constant, the higher the vehicle speed is, the larger negative value the correction coefficient H3 is set to, whereby the boundary norm yaw rate $\omega\_TAR$ can be configured to be low.

Figure 13:
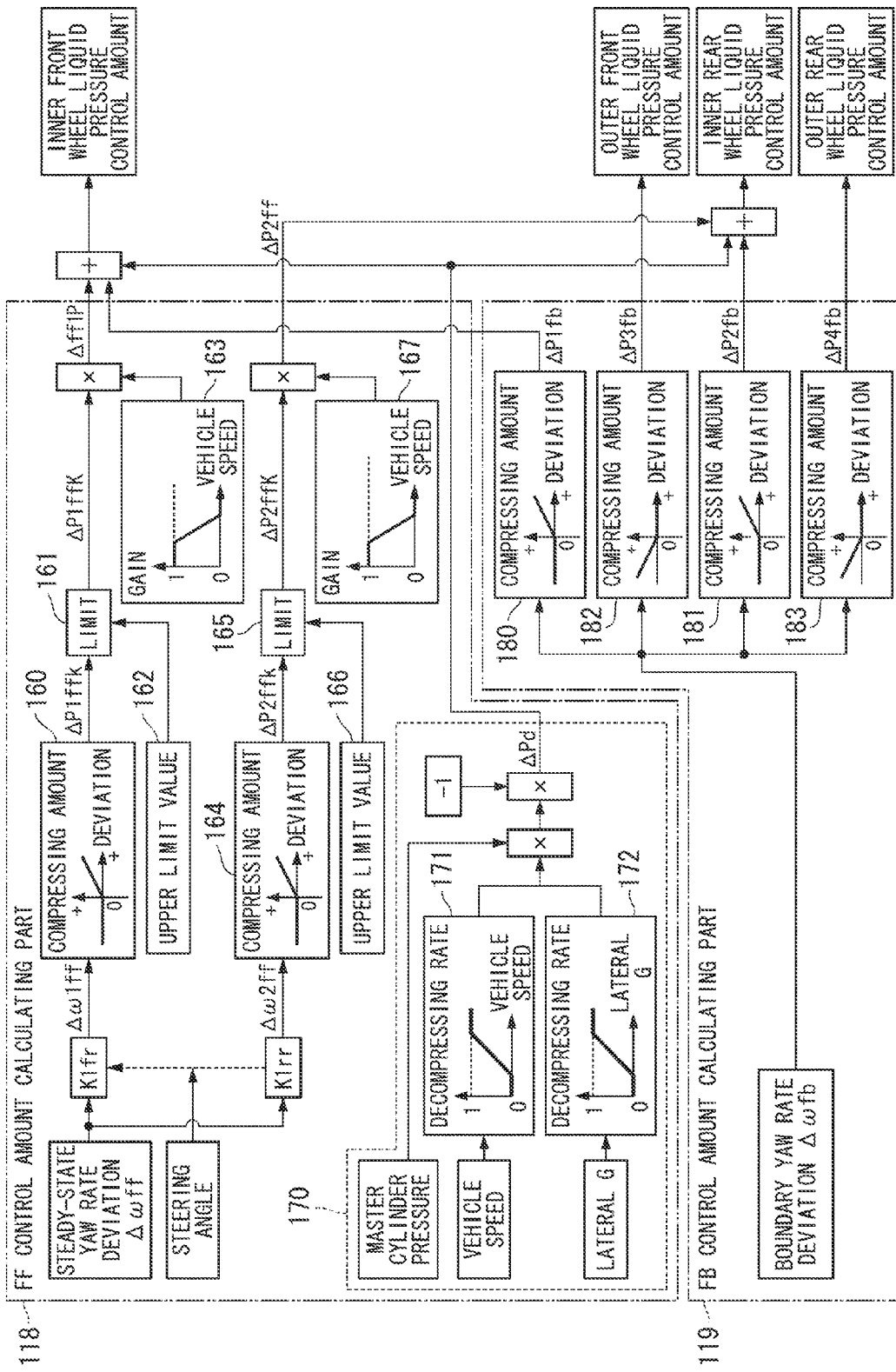
FIG. 13 is a block diagram of the calculation of a braking force control amount according to the above-described embodiment.

Next, brake control amount calculating that is performed by the control amount-calculating section 117 will be described with reference to FIG. 13.

As described above, in the control amount-calculating section 117, the FF control amount-calculating part 118 calculates the FF control amount based on the steady-state yaw rate deviation $\Delta\omega ff$, and the FB control amount-calculating part 119 calculates the FB control amount based on the boundary yaw rate deviation $\Delta\omega fb$. Then, the control amount-calculating section 117 adds the FF control amount and the FB control amount together so as to calculate a total control amount for each vehicle wheel.

First, the calculation of the FF control amount, which is performed in the FF control amount-calculating part 118, will be described.

First, based on the steering angle that is detected by the steering angle sensor 103, a compressing distribution between the inner-side front wheel, that is, an FR turning inner wheel (hereinafter, abbreviated as an inner front wheel) of a turning vehicle and the inner-side rear wheel, that is, an RR turning inner wheel (hereinafter, abbreviated as an inner rear wheel) of the turning vehicle is determined. Then, based on the compressing distribution, a compressing coefficient K1fr for the inner front wheel and a compressing coefficient K1rr for the inner rear wheel are calculated. Here, in a case where the movement of the load according to steering is large, the compressing coefficient K1fr for the inner front wheel may be set to increase in accordance with the steering angle.

Then, based on the compressing coefficient K1fr for the inner front wheel and the compressing coefficient K1rr for the inner rear wheel, the calculation of the FF compressing amount $\Delta P1ff$ for the inner front wheel and the calculation of the FF compressing amount $\Delta P2ff$ for the inner rear wheel are performed in parallel.

First, the calculation of the FF compressing amount $\Delta P1ff$ for the inner front wheel will be described. The steady-state yaw rate deviation $\Delta\omega 1 \cdot ff$ for the inner front wheel is calculated by multiplying the steady-state yaw rate deviation $\Delta\omega ff$, which is calculated by the steady-state yaw rate deviation-calculating section 113, by an increase coefficient K1fr.

Next, the brake liquid compressing amount $\Delta P1ffk$ of the inner front wheel is calculated in accordance with the steady-state yaw rate deviation $\Delta\omega 1 \cdot ff$ for the inner front wheel by referring to a compressing amount table 160. In the compressing amount table 160, the horizontal axis is the steady-state yaw rate deviation $\Delta\omega 1 \cdot ff$, and the vertical axis is the brake liquid compressing amount $\Delta P1ffk$. In this embodiment, in a case where the steady-state yaw rate deviation $\Delta\omega 1 \cdot ff$ for the inner front wheel is equal to or less than zero, the brake liquid compressing amount $\Delta P1ffk$ is zero, and, in a case where the steady-state yaw rate deviation $\Delta\omega 1 \cdot ff$ for the inner front wheel is equal to or more than zero, as the steady-state yaw rate deviation $\Delta\omega 1 \cdot ff$ increases, the brake liquid compressing amount $\Delta P1ffk$ increases.

Next, a limit-processing unit 161 performs a limit process such that the brake liquid compressing amount $\Delta P1ffk$ of the inner front wheel does not exceed an upper limit value. The upper limit value is an arbitrary value that is calculated by the upper limit value-calculating unit 162, and, by setting the brake liquid compressing amount $\Delta P1ffk$ not to exceed this value, an abrupt change in the brake liquid compressing amount $\Delta P1ffk$ is suppressed.

Next, the FF compressing amount $\Delta P1ff$ for the inner front wheel is calculated by multiplying the brake liquid compressing amount $\Delta P1ffk$ of the inner front wheel, for which the limit process is performed, by a gain according to the vehicle speed. In addition, the gain according to the vehicle speed is calculated based on a gain table 163. In this gain table 163, the horizontal axis is the vehicle speed, and the vertical axis is the gain. In a low vehicle-speed region, the gain is constant as gain=1. In a case where the vehicle speed is equal to or higher than an arbitrary threshold value (predetermined value) set in advance, as the vehicle speed increases, the gain gradually decreases. In a high vehicle-speed region, the gain is constant as gain=0.

As a result of multiplying with the gain according to the vehicle speed as above, when the vehicle speed is high, the FF compressing amount ΔP1ff of the inner front wheel is zero. In other words, when the vehicle speed is high, the FF compressing amount ΔP1ff of the inner front wheel is configured to be invalid. Through this, the vehicle behavior is prevented from being unstable due to a steering assist brake at a high vehicle speed. In addition, instead of multiplying with the gain according to the vehicle speed, it may be configured such that a limit value decreasing as the vehicle speed increases is given, and the FF compressing amount ΔP1ff is set so as not to exceed the limit value.

The calculation of the FF compressing amount ΔP2ff for the inner rear wheel is the same as the calculation of the FF compressing amount ΔPfr1 for the inner front wheel and will be briefly described.

The steady-state yaw rate deviation Δω2·ff for the inner rear wheel is calculated by multiplying the steady-state yaw rate deviation Δωff, which is calculated by the steady-state yaw rate deviation-calculating section 113, by the increase coefficient K1rr for the inner rear wheel.

Next, the brake liquid compressing amount ΔP2ffk of the inner rear wheel is calculated in accordance with the steady-state yaw rate deviation Δω2·ff for the inner rear wheel by referring to a compressing amount table 164. The compressing amount table 164 is the same as the compressing amount table 160, and thus, the description thereof will be omitted.

Next, a limit-processing unit 165 performs a limit process such that the brake liquid compressing amount ΔP2ffk of the inner rear wheel does not exceed an upper limit value. The upper limit value is calculated by the upper limit value-calculating unit 166. The upper limit value-calculating unit 166 is the same as the upper limit value-calculating unit 162.

Next, the FF compressing amount ΔP2ff for the inner rear wheel is calculated by multiplying the brake liquid compressing amount ΔP2ffk of the inner rear wheel, for which the limit process is performed, by a gain that is calculated by the gain table 167. The gain table 167 is the same as the gain table 163, and thus, the description thereof will be omitted.

In addition, the FF control amount-calculating part 118 includes an inner wheel decompressing amount-calculating section 170. The inner wheel decompressing amount-calculating section 170 is used for limiting the brake liquid pressure of the inner-side vehicle wheel (turning inner wheels) of the vehicle during turning in advance under the premise that the vehicle behavior is unstable due to braking when the vehicle speed is high or the longitudinal G is high.

The inner wheel decompressing amount-calculating section 170 calculates a decompressing rate according to the vehicle speed by referring to a first decompressing rate table 171 and calculates a decompressing rate according to the lateral G by referring to a second decompressing rate table 172. Then, the inner wheel decompressing amount-calculating section 170 calculates a total decompressing rate by multiplying with the calculated decompressing rate.

In the first decompressing rate table 171, the horizontal axis is the vehicle speed, and the vertical axis is the decompressing rate. In a low vehicle-speed region, the decompressing rate is constant as decompressing rate=0. In a case where the vehicle speed is equal to or higher than an arbitrary threshold value (predetermined value) set in advance, as the vehicle speed increases, the decompressing rate gradually increases. In a high vehicle-speed region, the decompressing rate is constant as decompressing rate=1.

In the second decompressing rate table 172, the horizontal axis is the lateral G, and the vertical axis is the decompressing rate. In a low lateral-G region, the decompressing rate is constant as decompressing rate=0. In a case where the lateral G is equal to or larger than an arbitrary threshold value (predetermined value) set in advance, as the lateral G increases, the decompressing rate gradually increases. In a high lateral-G region, the decompressing rate is constant as decompressing rate=1.

Through this, a total decompressing rate is set to a value that is between zero and one in accordance with the vehicle speed at the time of driving and the lateral G.

Then, an inner wheel decompressing amount ΔPd is acquired by multiplying the total decompressing rate acquired as above by master cylinder pressure of the brake device 110 and multiplying the result by −1.

Next, the calculation of the FB control amount, which is performed in the FB control amount-calculating part 119, will be described.

The FB control amount-calculating part 119, based on the boundary yaw rate deviation Δωfb that is calculated by the boundary yaw rate deviation-calculating section 116, calculates an FB compressing amount ΔP1fb of the inner front wheel, an FB compressing amount ΔP3fb of the outer front wheel, that is, the FR turning outer wheel (hereinafter, abbreviated as an outer front wheel) of a vehicle during turning, the FB compressing amount ΔP2fb of the inner rear wheel, an FB compressing amount ΔP4fb of the outer rear wheel, that is, the RR turning outer wheel (hereinafter, abbreviated as an outer rear wheel) of the vehicle during turning. In addition, a case will be described as an example in which the turning direction is a direction in which the sign of the deviation Δωfb is positive, and the norm yaw rate and the actual yaw rate are positive.

The FB compressing amount ΔP1fb of the inner front wheel is calculated based on the boundary yaw rate deviation Δωfb by referring to a compressing amount table 180. In the compressing amount table 180, the horizontal axis is the boundary yaw rate deviation Δωfb, and the vertical axis is the FB compressing amount ΔP1fb. In this embodiment, in a case where the boundary yaw rate deviation Δωfb is equal to or less than zero, the FB compressing amount ΔP1fb is zero. In a case where the boundary yaw rate deviation Δωfb is equal to or more than zero, as the boundary yaw rate deviation Δωfb increases, the FB compressing amount ΔP1fb increases.

The FB compressing amount ΔP2fb of the inner rear wheel is calculated based on the boundary yaw rate deviation Δωfb by referring to a compressing amount table 181. In the compressing amount table 181, the horizontal axis is the boundary yaw rate deviation Δωfb, and the vertical axis is the FB compressing amount ΔP2fb. In this embodiment, in a case where the boundary yaw rate deviation Δωfb is equal to or less than zero, the FB compressing amount ΔP2fb is zero. In a case where the boundary yaw rate deviation Δωfb is equal to or more than zero, as the boundary yaw rate deviation Δωfb increases, the FB compressing amount ΔP2fb increases.

The FB compressing amount ΔP3fb of the outer front wheel is calculated based on the boundary yaw rate deviation Δωfb by referring to a compressing amount table 182. In the compressing amount table 182, the horizontal axis is the boundary yaw rate deviation Δωfb, and the vertical axis is the FB compressing amount ΔP3fb. In this embodiment, in a case where the boundary yaw rate deviation Δωfb is equal to or higher than zero, the FB compressing amount ΔP3fb is zero. In a case where the boundary yaw rate deviation Δωfb is equal to or less than zero, as the absolute value of the boundary yaw rate deviation Δωfb increases, the FB compressing amount ΔP3fb increases.

The FB compressing amount ΔP4fb of the outer rear wheel is calculated based on the boundary yaw rate deviation Δωfb by referring to a compressing amount table 183. In the compressing amount table 183, the horizontal axis is the boundary yaw rate deviation $\Delta\omega fb$, and the vertical axis is the FB compressing amount $\Delta P4fb$. In this embodiment, in a case where the boundary yaw rate deviation $\Delta\omega fb$ is equal to or higher than zero, the FB compressing amount $\Delta P4fb$ is zero. In a case where the boundary yaw rate deviation $\Delta\omega fb$ is equal to or less than zero, as the absolute value of the boundary yaw rate deviation $\Delta\omega fb$ increases, the FB compressing amount $\Delta P4fb$ increases.

In other words, in the FB control amount-calculating part 119, in a case where the boundary yaw rate deviation $\Delta\omega fb$ is equal to or higher than zero, the actual yaw rate is lower than the boundary norm yaw rate. Accordingly, the FB control amount of each vehicle wheel is set in a direction increasing the yaw rate (in other words, in a direction negating the boundary yaw rate deviation $\Delta\omega fb$). More specifically, the FB compressing amounts are set so as to increase the brake liquid pressure of the inner front wheel and the inner rear wheel, and the FB compressing amounts are set so as not to increase the brake liquid pressure of the outer front wheel and the outer rear wheel.

Meanwhile, in a case where the boundary yaw rate deviation $\Delta\omega fb$ is equal to or lower than zero, the actual yaw rate is higher than the boundary norm yaw rate. Accordingly, the FB control amount of each vehicle wheel is set in a direction decreasing the yaw rate (in other words, in a direction negating the boundary yaw rate deviation $\Delta\omega fb$). More specifically, the FB compressing amounts are set so as to increase the brake liquid pressure of the outer front wheel and the outer rear wheel, and the FB compressing amounts are set so as not to increase the brake liquid pressure of the inner front wheel and the inner rear wheel.

Then, the control amount-calculating section 117 outputs a value acquired by adding the FF compressing amount $\Delta P1ff$ of the inner front wheel, the FB compressing amount $\Delta P1fb$ of the inner front wheel, and the inner wheel decompressing amount $\Delta Pd$ to the brake device 10 as a total control amount for the inner front wheel. In addition, the control amount-calculating section 117 outputs a value acquired by adding the FF compressing amount $\Delta P2ff$ of the inner rear wheel, the FB compressing amount $\Delta P2fb$ of the inner rear wheel, and the inner wheel decompressing amount $\Delta Pd$ to the brake device 10 as a total control amount for the inner rear wheel. Furthermore, the control amount-calculating section 117 outputs the FB compressing amount $\Delta P3fb$ of the outer front wheel to the brake device 10 as a total control amount of the outer front wheel. In addition, the control amount-calculating section 117 outputs the FB compressing amount $\Delta P4fb$ of the outer rear wheel to the brake device 10 as a total control amount of the outer rear wheel.

The brake device 10 controls the liquid pressure of the wheel cylinder of each vehicle wheel in accordance with the input control amount of each vehicle wheel.

This vehicle behavior control device 100 estimates the slippage state (side-slippage state) based on the boundary yaw rate deviation $\Delta\omega fb$. Then, the vehicle behavior control device 100 performs feedback control (side-slippage-suppressing brake control) of each vehicle wheel such that the boundary yaw rate deviation $\Delta\omega fb$ is close to zero. Through this, the vehicle behavior control device 100 achieves the stabilization of the vehicle behavior. In addition, simultaneously with this, the vehicle behavior control device 100 controls the brake of each vehicle wheel based on the steady-state yaw rate deviation $\Delta\omega ff$ in a feed-forward manner. Through this, the vehicle behavior control device 100 assists the turning of the vehicle at the time of steering, thereby achieving the improvement of the responsiveness of the steering. The turning assist brake control for assisting the turning at the time of steering is performed also when the boundary yaw rate deviation $\Delta\omega fb$ is zero, in other words, when the vehicle is determined not to be in the slippage state.

In this embodiment, a first control unit that increases or decreases the liquid pressure of the liquid pressure of the wheel cylinder in accordance with the a steering operation not through the slippage state of the vehicle is configured by the steering-angle norm yaw rate-calculating section 111, the steady-state norm yaw rate-calculating section 112, the steady-state yaw rate deviation-calculating section 113, and the FF control amount-calculating part 118. The turning assist brake control is performed by the first control unit. In addition, a second control unit that increases or decreases the liquid pressure of the wheel cylinder in accordance with the degree of the slippage state of the vehicle is configured by the lateral G-norm yaw rate-calculating section 114, the correction section 115, the boundary yaw rate deviation-calculating section 116, and the FB control amount-calculating part 119. Side-slippage suppressing brake control is performed by the second control unit.

Next, the seat belt control device 21 will be described with reference to FIGS. 2 and 14 to 17.

As described above, from the vehicle behavior control device 100, the sensor output signals of the longitudinal G sensor 101, the lateral G sensor 105, and the yaw rate sensor 106, the steady-state yaw rate deviation $\Delta\omega ff$ and the boundary yaw rate deviation $\Delta\omega fb$ both calculated by the brake control unit 102, and the prefill control amount of the prefill control unit 190 are input to the seat belt control device 21. The seat belt control device 21 controls the motor 10 based on this information.

As illustrated in FIG. 2, the seat belt control device 21 includes a target current-setting unit 41 and a current control unit 42. The current control unit 42 includes a waiting current control unit 43 and a variable current control unit 44.

The target current-setting unit 41 sets the target current of the motor 10 based on the movement state amount of the vehicle. The current control unit 42 performs current control such that a current that actually flows through the motor 10, that is, the actual current coincides with the target current that is set by the target current-setting unit 41.

Figure 14:
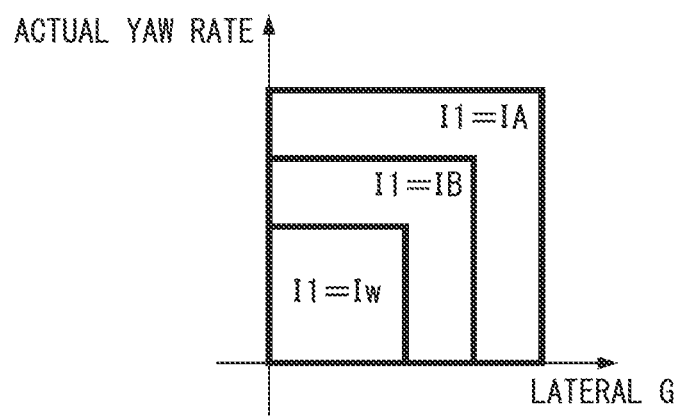
FIG. 14 is a target current map that is used in the above-described embodiment.

The target current-setting unit 41 will be described. In this embodiment, as values (movement state amounts) that represent the movement state of the vehicle, the yaw rate and the lateral G are used. The target current-setting unit 41 sets the target current I1 by referring to a target current map that is illustrated in FIG. 14 based on the actual yaw rate detected by the yaw rate sensor 106 and the lateral G detected by the lateral G sensor 105. In the target current map illustrated in FIG. 14, the horizontal axis is the lateral G, and the vertical axis is the actual yaw rate. In a region in which both the lateral G and the actual yaw rate are low, the target current I1 is set to the waiting current Iw (I1=Iw). In a region in which both the lateral G and the actual yaw rate are middle ratios, the target current I1 is set to IB (I1=IB). In a region in which both the lateral G and the actual yaw rate are high, the target current I1 is set to IA (I1=IA). Here, the waiting current Iw is a low current Iw (a nearly minimal current for maintaining a connection state) for which the above-described clutch 20 is maintained in a connection state. The current value IB is a current value that is larger than the waiting current Iw. The current value IA is a current value that is further larger than the current value IB.

Figure 15:
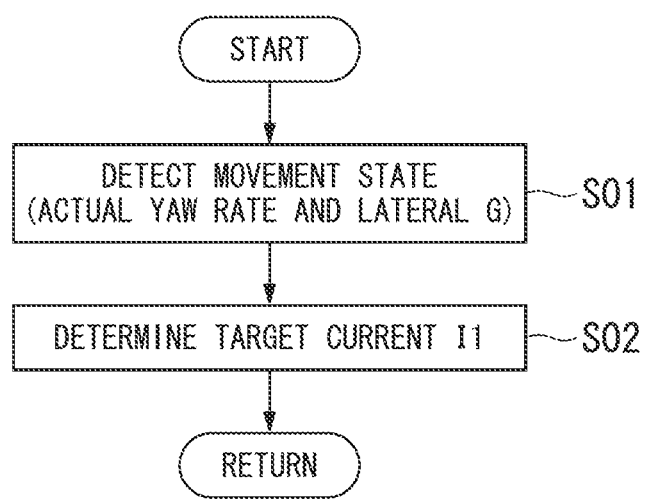
FIG. 15 is a flowchart that illustrates a target current determining process according to the above-described embodiment.

A target current determining process that is performed by the target current-setting unit 41 will be described with reference to a flowchart illustrated in FIG. 15. First, a lateral G and an actual yaw rate are detected by the lateral G sensor 105 and the yaw rate sensor 106 (Step S01). Next, a target current I1 according to the lateral G and the actual yaw rate is determined by referring to the target current map illustrated in FIG. 14 (Step S02). This target current determining process is repeatedly performed for every predetermined time (for example, for every 20 msec).

In addition, in this embodiment, although the target current is set based on the actual yaw rate and the lateral G, a boundary yaw rate deviation $\Delta\omega fb$ may be used instead of the actual yaw rate. Alternatively, instead of using the lateral G, a target current can be set based on only the actual yaw rate or the boundary yaw rate deviation $\Delta\omega fb$.

Figure 16:
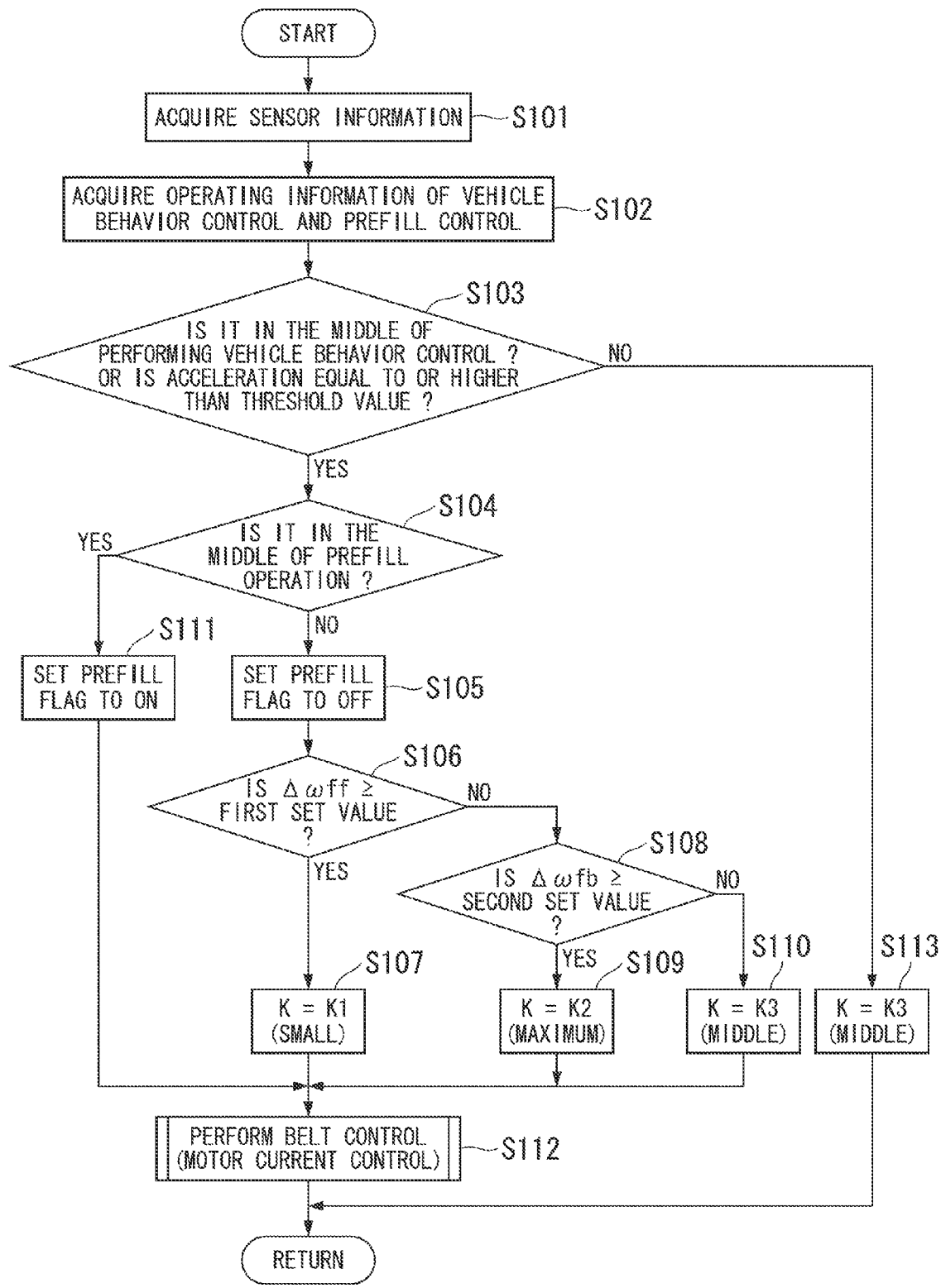
FIG. 16 is a flowchart that illustrates motor control according to the above-described embodiment.
Figure 17:
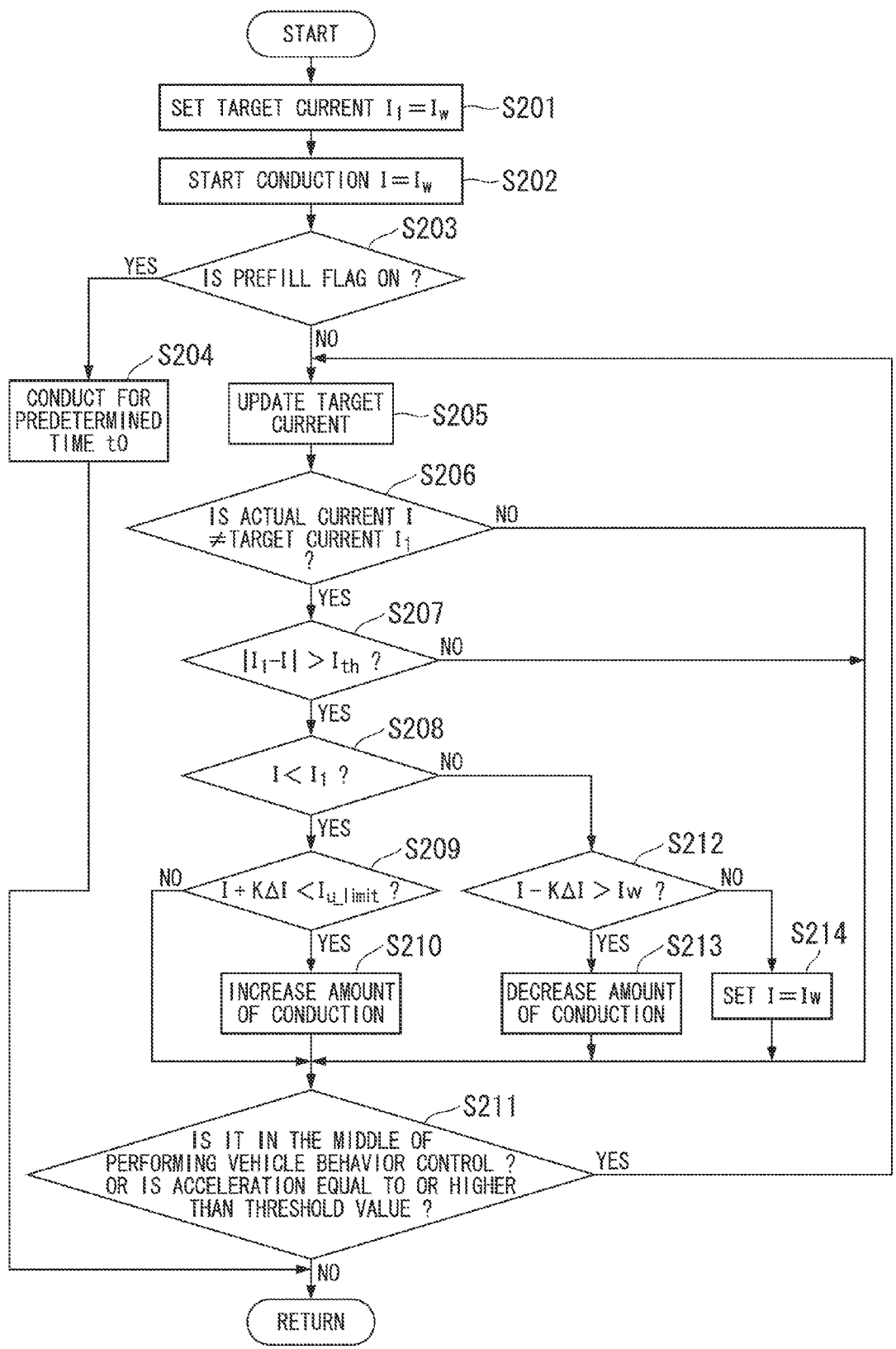
FIG. 17 is a flowchart that illustrates motor current control according to the above-described embodiment.

Next, motor control that is performed by the current control unit 42 will be described with reference to FIGS. 16 and 17. FIG. 16 is a flowchart that illustrates the motor control. FIG. 17 is a flowchart that illustrates current control of the motor 10.

First, the motor control will be described with reference to the flowchart illustrated in FIG. 16.

In Step S101, detection values of the longitudinal G sensor 101 and the lateral G sensor 105 are acquired.

Next, the process proceeds to Step S102, and operation information of the vehicle behavior control device 100 and the prefill control unit 190 are acquired. The operation information of the vehicle behavior control device 100, specifically, is the steady-state yaw rate deviation $\Delta\omega ff$ and the boundary yaw rate deviation $\Delta\omega fb$ that are input from the brake control unit 102 to the seat belt control device 21. The operation information of the prefill control unit 190 is a prefill control amount that is input from the prefill control amount output section 192 to the seat belt control device 21.

Next, the process proceeds to Step S103, and it is determined whether or not the vehicle behavior control device 100 is in the middle of performing the vehicle behavior control or whether or not the acceleration (the longitudinal G or the lateral G) is equal to or higher than a set threshold value (predetermined value). Whether or not the vehicle behavior control device 100 is in the middle of performing the vehicle behavior control is determined based on the steady-state yaw rate deviation $\Delta\omega ff$ and the boundary yaw rate deviation $\Delta\omega fb$ that are input from the brake control unit 102 to the seat belt control device 21. In a case where at least one of the steady-state yaw rate deviation $\Delta\omega ff$ and the boundary yaw rate deviation $\Delta\omega fb$ is not zero, it is determined that the vehicle behavior control device 100 is in the middle of performing the vehicle behavior control. In other words, in this embodiment, the vehicle behavior control includes turning assist brake control that assists the turning of the vehicle by controlling the brake based on only the steady-state yaw rate deviation $\Delta\omega ff$. In addition, in a case where both the steady-state yaw rate deviation $\Delta\omega ff$ and the boundary yaw rate deviation $\Delta\omega fb$ are zero, it is determined that the vehicle behavior control device 100 is not in the middle of performing the vehicle behavior control.

The determination result of Step S103 determines whether or not the motor 10 is conducted. In a case where the determination result of Step S103 is "YES", the motor 10 is conducted, and current control is performed. In a case where the determination result of Step S103 is "NO", the conduction of the motor 10 is not performed.

Described in more detail, in a case where the determination result of Step S103 is "YES", in other words, when the vehicle behavior control device 100 is in the middle of performing the vehicle behavior control or when the acceleration (the longitudinal G or the lateral G) is equal to or higher than a set threshold value (predetermined value), the process proceeds to Step S104, and it is determined whether or not the prefill operation is in the middle of the process. In addition, the determination on whether or not the prefill operation is in the middle of the process is determined based on the prefill control amount that is input from the prefill control amount output section 192 to the seat belt control device 21. In a case where the prefill control amount is zero, a non-prefill operation is determined. In a case where the prefill control amount is larger than zero, the prefill operation is determined to be in the middle of the process.

In a case where the determination result of Step S104 is "NO" (non-prefill operation), the process proceeds to Step S105, and the prefill flag is set to OFF, and the process proceeds to Step S106.

In Step S106, it is determined whether or not the steady-state yaw rate deviation $\Delta\omega ff$ input from the brake control unit 102 is equal to or more than a first set value (first predetermined value). The first set value, for example, is set to a value of the steady-state yaw rate deviation that can be taken in a case where the steering angle is relative large, and the vehicle speed is a middle or low speed.

In a case where the determination result of Step S106 is "YES" ($\Delta\omega ff \geq$first set value), the process proceeds to Step S107, and the first set value is set to a value K1 that is smaller than a value that is based on the gain K. The gain K is a gain that is used for determining the magnitude of a current change when the actual current flowing through the motor 10 gradually approaches the target current in the current control of the current flowing through the motor 10 that is performed in Step S112 to be described later.

On the other hand, in a case where the determination result of Step S106 is "NO" ($\Delta\omega ff<$first set value), the process proceeds to Step S108, and it is determined whether or not the boundary yaw rate deviation $\Delta\omega fb$ input from the brake control unit 102 is equal to or larger than a second set value (second predetermined value). The second set value is set to the value of the boundary yaw rate corresponding to the steering angle at which the lateral acceleration is equal to or higher than a reference value set in advance.

In a case where the determination result of Step S108 is "YES" ($\Delta\omega fb\geq$second set value), the process proceeds to Step S109, and the gain K is set to a value K2 (K2>K1) that is larger than K1.

In a case where the determination result of Step S108 is "NO" ($\Delta\omega fb<$second set value), the process proceeds to Step S110, and the gain K is set to a value K3 (K1<K3<K2) that is larger than K1 and is smaller than K2. Accordingly, the gain K2 set in Step S109 is the maximum.

Then, the process proceeds to Step S112 from Steps S107, S109, and S110, the current control of the current flowing through the motor 10 is performed, and the process is returned to the start.

In addition, in a case where the determination result of Step S104 is "YES" (in the middle of a prefill operation), the process proceeds to Step S111, and the prefill flag is set to ON. Subsequently, the process proceeds to Step S112, and the current control of the current flowing through the motor 10 is performed, and the process is returned to the start.

On the other hand, in a case where the determination result of Step S103 is "NO", in other words, when the vehicle behavior control device 100 is not operated, and when the acceleration is lower than the set threshold value (predetermined value), the process proceeds to Step S113, the gain K is set to K3, and the process is returned to the start. In other words, in this case, the current control of the current flowing through the motor 10 is not performed (the motor 10 is not conducted), and the process is returned to the start. The gain K3 that is set in Step S113 has the same value as that of the gain K3 set in Step S110.

Next, the current control of the current flowing through the motor 10, which is performed in Step S112, will be described with reference to a flowchart illustrated in FIG. 17.

First, in Step S201, the target current I1 is set to the waiting current Iw. Next, the process proceeds to Step S202, and the conduction of the motor 10 is started. In addition, the waiting current Iw is the low current Iw (a current value that is nearly a minimum for maintaining a connection state) for which the clutch 20 is maintained in the connection state.

Next, the process proceeds to Step S203, and it is determined whether or not the prefill flag is ON.

In a case where the determination result of Step S203 is "YES" (ON), since the prefill operation is in the middle of the process, the process proceeds to Step S204, conduction through the waiting current Iw is performed for a predetermined time t0, and the process is returned to the start.

On the other hand, in a case where the determination result of Step S203 is "NO" (OFF), since a state is formed in which prefill is not operated, the process proceeds to Step S205, and the target current I1 is updated with a target current that is latest set by the target current-setting unit 41.

Next, the process proceeds to Step S206, and it is determined whether the present value of the current flowing through the motor 10, that is, the actual current I detected by the current sensor 40, does not coincide with the target current I1.

In a case where the determination result of Step S206 is "YES" (I≠I1), the process proceeds to Step S207, and it is determined whether or not the absolute value ΔI (ΔI=|I1−I|) of a difference between the target current I1 and the actual current I is larger than an allowed value Ith.

In a case where the determination result of Step S207 is "YES" (ΔI>Ith), since the actual current I is deviated from the allowed range of the target current I1, the process proceeds to Step S208, and it is determined whether or not the actual current I is lower than the target current I1.

In a case where the determination result of Step S208 is "YES" (I<I1), the process proceeds to Step S209, and it is determined whether a sum (I+KΔI) that is acquired by adding the actual current I to a value acquired by multiplying the absolute value ΔI of a difference between the target current I1 and the actual current I by the gain K is smaller than the upper limit current value Iu_limit. In other words, it is determined whether or not the amount of conduction to the motor 10 increased from the current amount of conduction by KΔI exceeds the upper limit current value Iu_limit. Here, the gain K is the gain K that is set in Steps S107, S109, S110, and S113 in the above-described flowchart illustrated in FIG. 16.

In a case where the determination result of Step S209 is "YES" (I+KΔI<Iu_limit), the process proceeds to Step S210, and the amount of conduction to the motor 10 is increased by KΔI to be I+KΔI, and the process proceeds to Step S211.

On the other hand, in a case where the determination result of Step S209 is "NO" (I+KΔI≥Iu_limit), the state is maintained without increasing the amount of conduction to the motor 10, and the process proceeds to Step S211.

In a case where the determination result of Step S208 is "NO" (I≥I1), the process proceeds to Step S212, and it is determined whether or not a difference (I−KΔI) that is acquired by subtracting a value, which is acquired by multiplying the absolute value ΔI of the difference between the target current I1 and the actual current I by the gain K, from the actual current I is larger than the waiting current Iw. In other words, it is determined whether the difference is larger than the waiting current Iw in a case the amount of conduction in the motor 10 is decreased by KΔI. Here, the gain K is the gain K that is set in Steps S107, S109, S110, and S113 in the above-described flowchart illustrated in FIG. 16.

In a case where the determination result of Step S212 is "YES" (I−KΔI>Iw), the process proceeds to Step S213, the amount of conduction in the motor 10 is decreased by KΔI to be I−KΔI, and the process proceeds to Step S211.

In a case where the determination result of Step S212 is "NO" (I−KΔI≤Iw), the process proceeds to Step S214, and the amount I of conduction in the motor 10 is set as the waiting current Iw, and the process proceeds to Step S211.

In addition, in a case where the determination result of Step S206 is "NO" (I=I1), since the actual current I of the motor 10 and the target current I coincide with each other, the process proceeds to Step S211.

In addition, in a case where the determination result of Step S207 is "NO" (ΔI≤Ith), although the actual current of the motor 10 does not coincide with the target current I1, it is in the allowed range, and thus, the process proceeds to Step S211.

In Step S211, it is determined whether or not the vehicle behavior control device 100 is in the middle of performing the vehicle behavior control or whether or not the acceleration (the longitudinal G or the lateral G) is equal to or higher than an arbitrary value (predetermined value) set in advance. In addition, a method of determining whether or not the vehicle behavior control device 100 is in the middle of performing the vehicle behavior control is the same as that of the case of Step S103 in the above-described flowchart illustrated in FIG. 16, and the description thereof will be omitted.

In a case where the determination result of Step S211 is "NO", since the driving state of the vehicle is stabilized, and the motor 10 does not need to be operated, the current control of the current flowing through the motor 10 ends, and the process is returned to the start.

In a case where the determination result of Step S211 is "YES", since the driving state of the vehicle does not arrive at a stable state, the process is returned to Step S205, and the process of a series of Steps S205 to S214 is repeatedly performed.

In this embodiment, by performing the process of Steps S201 to S204, the function of the waiting current control unit 43 is realized. In addition, by performing the process of Steps S205 to S214, the function of the variable current control unit 11 is realized.

According to the seat belt device 1 that controls the amount of conduction in the motor 10 as above, the waiting current Iw that maintains the clutch 20 to be in the connection state flows through the motor 10. In other words, when the brake device 110 is in the middle of the prefill operation, when the vehicle behavior control device 100 is in the middle of performing the vehicle behavior control, and the acceleration of the vehicle is equal to or higher than the threshold value (predetermined value), the waiting current Iw flows through the motor 10. In this state, rotation resistance of the motor 10 side is applied to the belt reel 12 (webbing 5) through the clutch 20, and an external force acting on the webbing 5 can be responded.

Especially, in a case where the intervention of the vehicle behavior control device 100 in the vehicle behavior control is performed at high speed, in other words, in a case where a steady-state yaw rate deviation Δωff occurs, only the waiting current Iw, which can maintain the clutch 20 to be in the connection state, flows through the motor 10. Accordingly, the load of the motor 10 is delivered to a vehicle occupant through the webbing 5 as an extremely light reaction force, and the vehicle occupant can maintain the posture. Therefore, according to the seat belt device 1, the vehicle occupant can be maintained in a natural driving posture without applying a large reaction force to the vehicle occupant.

In addition, according to the seat belt device 1, while the amount of conduction in the motor 10 is controlled to be at the waiting current Iw, a change in the value representing the movement state of the vehicle formed thereafter can be prepared.

In addition, according to the vehicle behavior control device 100, in a case where the boundary yaw rate deviation Δωfb is almost zero, and the steady-state yaw rate deviation Δωff is not zero, in other words, when the vehicle is turned through steering in a state in which a slippage state (side-slippage state) does not occur in the vehicle, turning assist brake control is performed. At that time, an operation signal is output from the vehicle behavior control device 100 so as to perform the current control of the current flowing through the motor 10. Even in a case where the current control of the current flowing through the motor 10 is frequently performed in accompaniment with the turning assist brake control, the current control of the current flowing through the motor 10 is started from the waiting current control. Accordingly, the vehicle occupant does not feel a sense of discomfort. In addition, also in this case, while the amount of conduction in the motor 10 is controlled to be at the waiting current Iw, a change in the value representing the movement state of the vehicle thereafter can be prepared. Accordingly, in a case where the vehicle behavior becomes unstable as a result of steering, and the target current I1 of the motor 10 is changed to a target current IA or IB that is higher than the waiting current Iw, the current control toward the target current can be performed without a time delay.

Furthermore, according to the seat belt device 1, in a case where, while the amount of conduction in the motor 10 is controlled to be at the waiting current Iw, the value representing the movement state of the vehicle is changed, and the target current I1 of the motor 10 is changed to the target current IA or IB that is higher than the waiting current Iw, current control is performed such that the amount of conduction in the motor 10 gradually increases such that the actual current I coincides with the target current I1 after the change. As a result, the belt reel 12 is rotated in a direction winding the webbing 5. Accordingly, the restraining force for the vehicle occupant through the webbing 5 can be appropriately changed in accordance with the change in the movement state of the vehicle. In addition, from a state in which the waiting current Iw that can initially maintain the clutch 20 to be in the connection state for the motor 10 flows through the motor, and a resisting force to some degree against an external force acting on the webbing 5 can be given, the amount of conduction in the motor 10 is gradually increased. Therefore, when the upper body of the vehicle occupant is restrained by the webbing 5 against the change in the value representing the movement state of the vehicle, a sense of discomfort (a shock according to a sharp increase in the tensile force) according to a sharp increase in torque is not given to the vehicle occupant.

In addition, the seat belt device 1 is controlled also at the time of performing the prefill operation such that the amount of conduction in the motor 10 is the waiting current Iw. Accordingly, even in a case where high deceleration acts by placing the foot on the brake pedal, from the state in which the clutch 20 is maintained to be in the connection state, control of increasing the amount of conduction in the motor 10 such that the actual current is the target current set in accordance with the movement state of the vehicle is performed. Accordingly, the time delay until the webbing 5 is retracted can be configured to be extremely small, and the posture of the vehicle occupant can be reliably maintained in a speedy manner.

Furthermore, according to the seat belt device 1, the gain K1 that is set when the steady-state yaw rate deviation Δωff is equal to or larger than the first set value is smaller than the gain K2 that is set when the boundary yaw rate deviation Δωfb is equal to or larger than the second set value. Accordingly, the amount of change in the current at the time of controlling the actual current I of the motor 10 to approach the target current I1 can be configured to be smaller than that at the time of performing side-slippage-suppressing brake control of the vehicle during the turning assist brake control. As a result, the change in torque of the motor 10 at the time of performing the turning assist brake control can be smaller than the change in the torque of the motor 10 at the time of performing the side-slippage-suppressing brake control. Through this, even in a case where the restraining force increases due to the retraction of the webbing 5 at the time of performing the turning assist brake control, it is difficult to give a sense of discomfort to the vehicle occupant. Especially, in a case where the turning assist brake control is performed on a winding road, at the time of turning to the left or right side at an intersection, or the like, an unnatural increase in the restraining force for the vehicle occupant due to the webbing 5 can be prevented.

In addition, the seat belt device 1 has the gain K2 that is set when the boundary yaw rate deviation Δωfb is equal to or higher than the second set value as the maximum value (K2>K3>K1). Accordingly, in an emergency, the webbing 5 can be wound by increasing the amount of conduction in the motor 10 to the target current I1 in a speedy manner. Accordingly, the vehicle occupant can be restrained in a speedy manner.

Furthermore, according to the seat belt device 1, when the steady-state yaw rate deviation Δωff is equal to or larger than the first set value, the gain K is set to the gain K1 having a small value. However, the steady-state yaw rate deviation Δωff occurs in the vehicle behavior control device 100 only when the vehicle speed is in a low speed region. When the vehicle is driven at middle or high speed, the steady-state yaw rate deviation Δωff is zero, and the gain K is not set to K1 at this time. Accordingly, when the vehicle behavior becomes unstable at middle or high speed, the gain K is set to K2 or K3. Therefore, in a case where the value representing the movement state of the vehicle is changed, and the target current I1 of the motor 10 is changed, the webbing 5 can be wound by increasing the amount of conduction in the motor 10 to the target current I1 in a speedy manner. Accordingly, the vehicle occupant can be restrained in a speedy manner.

In addition, according to this seat belt device 1, operation signals (the steady-state yaw rate deviation Δωff and the boundary yaw rate deviation Δωfb) that are different in accordance with the operation state are output from the vehicle behavior control device 100 to the seat belt control device 21. In addition, the seat belt control device 21 performs current control of the current flowing through the motor 10 based on the operation signals input from the vehicle behavior control device 100. Accordingly, the seat belt control device 21 does not independently determine the vehicle behavior, the movement state of the vehicle, and the like. As a result, the calculation load of the seat belt control device 21 can be reduced.

As above, although a preferred embodiment of the present invention has been described, the present invention is not limited only to the above-described embodiment. Thus, addition, omission, substitution, and the like of the configuration can be made in the range not departing from the concept of the present invention. The present invention is not limited to the description presented above but is limited only by the scope of the appended claims.

INDUSTRIAL APPLICABILITY

According to this seat belt device, a vehicle occupant can be restrained at the optimal timing, whereby a sense of discomfort of the vehicle occupant can be reduced.

REFERENCE SIGNS LIST 1 seat belt device
2 seat
5 webbing
10 motor
12 belt reel
20 clutch
21 seat belt control device (motor control unit)
43 waiting current control unit
44 variable current control unit
100 vehicle behavior control device (brake control unit)
101 longitudinal G sensor (detection unit)
105 lateral G sensor (detection unit)
106 yaw rate sensor (detection unit)
110 brake device
113 steady-state yaw rate deviation-calculating section (detection unit)
116 boundary yaw rate deviation-calculating section (detection unit)
190 prefill control unit (precompressing unit)

The invention claimed is:

1. A vehicle seat belt device comprising:
a webbing configured to retain a vehicle occupant seated on a seat of a vehicle;
a belt reel around which the webbing is wound;
a motor that delivers a rotational driving force to the belt reel;
a clutch that maintains a connection state between the motor and the belt reel in a case where rotation torque in a webbing winding direction of the motor, which is equal to or larger than a set value, is received;
a detection unit configured to detect a movement state of the vehicle;
a brake control unit configured to control a vehicle behavior by compressing or decompressing liquid placed inside a wheel cylinder of a brake device that brakes vehicle wheels of the vehicle; and
a motor control unit configured to control an amount of conduction in the motor when the brake control unit outputs an operation signal representing that control of the vehicle behavior is in middle of process or when the movement state of the vehicle is detected by the detection unit to be in a movement state set in advance,
wherein the motor control unit includes:
a waiting current control unit configured to conduct a current that maintains the clutch to be in the connection state in the motor when the brake control unit outputs the operation signal; and
a variable current control unit configured to adjust the amount of conduction in the motor based on the movement state of the vehicle that is detected by the detection unit
wherein the variable current control unit proceeds from current control performed by the waiting current control unit to current control performed by the variable current control unit when a change in the movement state of the vehicle is detected by the detection unit during the current control performed by the waiting current control unit, and
wherein the brake control unit outputs an operation signal that differs in accordance with an operating state.

2. The vehicle seat belt device according to claim 1,
wherein the brake control unit includes a precompressing unit configured to perform precompressing control of pressure of the liquid placed inside the wheel cylinder in a non-operating state of an acceleration pedal of the vehicle, and
wherein the current control performed by the waiting current control unit is performed also when the motor control unit outputs a precompressing operation signal that represents that the precompressing unit is in an operating state.

3. The vehicle seat belt device according to claim 1, wherein the brake control unit includes a first control unit configured to compress or decompress the liquid placed inside the wheel cylinder in accordance with a steering operation not based on a slippage state of the vehicle and outputting the operating signal.

4. The vehicle seat belt device according to claim 3,
wherein the brake control unit further includes second control unit configured to compress or decompress the liquid placed inside the wheel cylinder in accordance with a degree of the slippage state of the vehicle and outputting the operating signal, and
wherein the variable current control unit compares a target current to be supplied to the motor, which is determined based on the movement state of the vehicle that is detected by the detection unit, and an actual current that flows through the motor with each other, changes the actual current based on a comparison result such that the actual current of the motor approaches the target current, and, in a case where an amount of control performed by the first control unit is equal to or larger than a first set value, decreases an amount of change at that time more than that of a case where an amount of control performed by the second control unit is equal to or larger than a second set value.

5. The vehicle seat belt device according to claim 4, wherein the variable current control unit sets the amount of change to be maximum in a case where the degree of the slippage state of the vehicle is equal to or larger than a reference that is set in advance.

6. The vehicle seat belt device according to claim 4, wherein the brake control unit outputs the operating signal by performing control performed by the first control unit only when the vehicle is driven at low speed.

* * * * *